US010051304B2

(12) United States Patent
Tidwell et al.

(10) Patent No.: US 10,051,304 B2
(45) Date of Patent: Aug. 14, 2018

(54) METHODS AND APPARATUS FOR TARGETED SECONDARY CONTENT INSERTION

(71) Applicant: Time Warner Cable Enterprises LLC, New York, NY (US)

(72) Inventors: Justin Tidwell, Waxhaw, NC (US); Edward G. Samame, Rowayton, CT (US); Bryan Santangelo, Tulsa, OK (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

(21) Appl. No.: 14/462,300

(22) Filed: Aug. 18, 2014

(65) Prior Publication Data

US 2015/0058883 A1 Feb. 26, 2015

Related U.S. Application Data

(63) Continuation of application No. 12/503,710, filed on Jul. 15, 2009, now Pat. No. 8,813,124.

(51) Int. Cl.
*H04N 21/262* (2011.01)
*H04N 21/2668* (2011.01)
(Continued)

(52) U.S. Cl.
CPC ......... *H04N 21/2668* (2013.01); *G06Q 30/02* (2013.01); *H04H 20/103* (2013.01);
(Continued)

(58) Field of Classification Search
CPC ............... H04N 21/812; H04N 21/222; H04N 21/23418; H04N 21/23424;
(Continued)

(56) References Cited

U.S. PATENT DOCUMENTS 4,521,881 A 6/1985 Stapleford et al.
4,546,382 A 10/1985 McKenna et al.
(Continued)

FOREIGN PATENT DOCUMENTS

WO WO-0191474 A2 11/2001

OTHER PUBLICATIONS

Open Cable Specification entitled "Enhanced TV Binary Interchange Format 1 0" 0C-SP-ETV-131F1.0-106-110128 dated Jan. 28, 2011, 408 pages.
(Continued)

*Primary Examiner* — Pankaj Kumar
*Assistant Examiner* — Alazar Tilahun
(74) *Attorney, Agent, or Firm* — Gazdzinski & Associates, PC

(57) ABSTRACT

Methods and apparatus for identification and insertion of content targeted to a particular audience within a content-based network, such as a cable television or satellite network. In one embodiment of the invention, audience qualities are identified and distributed to an advertisement decision maker, which uses the information to fulfill advertisement placement opportunities. Qualifiers about an existing or projected audience are classified utilizing an algorithm for qualifier weight and variance in order to determine the proximity any given qualifier may be to a target audience for an advertisement. Subscriber privacy and anonymity is also optionally maintained via e.g., hashing or encrypting data relating to the CPE and/or subscriber, thus ensuring that audience data is not traceable to a specific user account. Business methods are also disclosed.

20 Claims, 18 Drawing Sheets

(51) Int. Cl.
  *G06Q 30/02* (2012.01)
  *H04H 20/10* (2008.01)
  *H04N 21/258* (2011.01)
  *H04N 21/442* (2011.01)
  *H04N 21/658* (2011.01)
  *H04N 21/81* (2011.01)
  *H04H 60/45* (2008.01)

(52) U.S. Cl.
  CPC . *H04N 21/25883* (2013.01); *H04N 21/25891* (2013.01); *H04N 21/26241* (2013.01); *H04N 21/44213* (2013.01); *H04N 21/6582* (2013.01); *H04N 21/812* (2013.01); *H04H 60/45* (2013.01)

(58) Field of Classification Search
  CPC ....... H04N 21/25883; H04N 21/25891; H04N 21/26241; H04N 21/2668; H04N 21/43; H04N 21/44213; H04N 21/6582; H04N 21/25866; H04N 21/25808; H04N 21/47202; H04N 21/2547; G06Q 30/00; G06Q 30/0251
  USPC .................................................... 725/32–36
  See application file for complete search history.

(56) References Cited

U.S. PATENT DOCUMENTS

| | | |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,373,315 A | 12/1994 | Dufresne et al. |
| 5,481,294 A | 1/1996 | Thomas et al. |
| 5,497,185 A | 3/1996 | Dufresne et al. |
| 5,600,364 A | 2/1997 | Hendricks et al. |
| 5,675,647 A | 10/1997 | Garneau et al. |
| 5,758,257 A | 5/1998 | Herz et al. |
| 5,774,170 A | 6/1998 | Hite et al. |
| 5,793,409 A | 8/1998 | Tetsumura |
| 5,812,642 A | 9/1998 | Leroy |
| 5,862,312 A | 1/1999 | Mann et al. |
| 5,914,945 A | 6/1999 | Abu-Amara et al. |
| 5,929,849 A | 7/1999 | Kikinis |
| 5,956,037 A | 9/1999 | Osawa et al. |
| 5,963,844 A | 10/1999 | Dail |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,124,878 A | 9/2000 | Adams et al. |
| 6,134,532 A | 10/2000 | Lazarus et al. |
| 6,161,142 A | 12/2000 | Wolfe et al. |
| 6,169,728 B1 | 1/2001 | Perreault et al. |
| 6,177,931 B1 | 1/2001 | Alexander et al. |
| 6,182,050 B1 | 1/2001 | Ballard |
| 6,202,210 B1 | 3/2001 | Ludtke |
| 6,211,901 B1 | 4/2001 | Imajima et al. |
| 6,216,129 B1 | 4/2001 | Eldering |
| 6,272,176 B1 | 8/2001 | Srinivasan |
| 6,282,713 B1 | 8/2001 | Kitsukawa et al. |
| 6,292,624 B1 | 9/2001 | Saib et al. |
| 6,330,609 B1 | 12/2001 | Garofalakis et al. |
| 6,389,538 B1 | 5/2002 | Gruse et al. |
| 6,396,055 B1 | 5/2002 | Biedendorf |
| 6,446,261 B1 | 9/2002 | Rosser |
| 6,463,585 B1 | 10/2002 | Hendricks et al. |
| 6,467,089 B1 | 10/2002 | Aust et al. |
| 6,502,076 B1 | 12/2002 | Smith |
| 6,549,718 B1 | 4/2003 | Grooters et al. |
| 6,560,578 B2 | 5/2003 | Eldering |
| 6,601,237 B1 | 7/2003 | Ten et al. |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,687,735 B1 | 2/2004 | Logston et al. |
| 6,700,624 B2 | 3/2004 | Yun |
| 6,704,930 B1 | 3/2004 | Eldering et al. |
| 6,718,551 B1 | 4/2004 | Swix et al. |
| 6,725,461 B1 | 4/2004 | Dougherty et al. |
| 6,738,978 B1 | 5/2004 | Hendricks et al. |
| 6,742,187 B1 | 5/2004 | Vogel |
| 6,771,290 B1 | 8/2004 | Hoyle |
| 6,775,843 B1 | 8/2004 | McDermott |
| 6,785,901 B1 | 8/2004 | Horiwitz et al. |
| 6,813,776 B2 | 11/2004 | Chernock et al. |
| 6,859,845 B2 | 2/2005 | Mate |
| 6,898,762 B2 | 5/2005 | Ellis et al. |
| 6,901,606 B2 | 5/2005 | Wright et al. |
| 6,909,837 B1 | 6/2005 | Unger |
| 6,915,528 B1 | 7/2005 | McKenna, Jr. |
| 6,990,680 B1 | 1/2006 | Wugofski |
| 7,017,179 B1 | 3/2006 | Asamoto et al. |
| 7,024,676 B1 | 4/2006 | Klopfenstein |
| 7,039,928 B2 | 5/2006 | Kamada et al. |
| 7,075,945 B2 | 7/2006 | Arsenault et al. |
| 7,100,183 B2 | 8/2006 | Kunkel et al. |
| 7,109,848 B2 | 9/2006 | Schybergson |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,126 B2 | 2/2007 | McElhatten et al. |
| 7,191,461 B1 | 3/2007 | Arsenault et al. |
| 7,197,472 B2 | 3/2007 | Conkwright et al. |
| 7,213,036 B2 | 5/2007 | Apparao et al. |
| 7,222,078 B2 | 5/2007 | Abelow |
| 7,228,555 B2 | 6/2007 | Schlack |
| 7,237,250 B2 | 6/2007 | Kanojia et al. |
| 7,242,988 B1 | 7/2007 | Hoffberg et al. |
| 7,246,150 B1 | 7/2007 | Donoho et al. |
| 7,246,172 B2 | 7/2007 | Yoshiba et al. |
| 7,266,836 B2 | 9/2007 | Anttila et al. |
| 7,280,737 B2 | 10/2007 | Smith |
| 7,281,261 B2 | 10/2007 | Jaff et al. |
| 7,317,728 B2 | 1/2008 | Acharya et al. |
| 7,327,692 B2 | 2/2008 | Ain et al. |
| 7,352,775 B2 | 4/2008 | Powell |
| 7,355,980 B2 | 4/2008 | Bauer et al. |
| 7,356,751 B1 | 4/2008 | Levitan |
| 7,357,775 B1 | 4/2008 | Koh |
| 7,363,371 B2 | 4/2008 | Kirby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,444,655 B2 | 10/2008 | Sardera |
| 7,457,520 B2 | 11/2008 | Rosetti et al. |
| 7,567,983 B2 | 7/2009 | Pickelsimer et al. |
| 7,577,118 B2 | 8/2009 | Haumonte et al. |
| 7,602,820 B2 | 10/2009 | Helms et al. |
| 7,603,529 B1 | 10/2009 | MacHardy et al. |
| 7,650,319 B2 | 1/2010 | Hoffberg et al. |
| 7,712,125 B2 | 5/2010 | Herigstad et al. |
| 7,720,432 B1 | 5/2010 | Colby et al. |
| 7,729,940 B2 | 6/2010 | Harvey et al. |
| 7,730,509 B2 | 6/2010 | Boulet et al. |
| 7,783,316 B1 | 8/2010 | Mitchell |
| 7,801,803 B2 | 9/2010 | Forlai |
| 7,900,052 B2 | 3/2011 | Jonas et al. |
| 7,900,229 B2 | 3/2011 | Dureau |
| 7,954,131 B2 | 5/2011 | Cholas et al. |
| 8,028,322 B2 | 9/2011 | Riedl et al. |
| 8,042,131 B2 | 10/2011 | Flickinger |
| 8,065,703 B2 | 11/2011 | Wilson et al. |
| 8,099,757 B2 | 1/2012 | Riedl et al. |
| 8,156,520 B2 | 4/2012 | Casagrande et al. |
| 8,205,226 B2 | 6/2012 | Ko et al. |
| 8,214,256 B2 | 7/2012 | Riedl et al. |

(56) References Cited

U.S. PATENT DOCUMENTS

| | | |
|---|---|---|
| 8,296,185 B2 | 10/2012 | Isaac |
| 8,347,341 B2 | 1/2013 | Markley et al. |
| 8,365,213 B1 | 1/2013 | Orlowski |
| 8,396,055 B2 | 3/2013 | Patel et al. |
| 8,396,056 B2 | 3/2013 | Dalton, Jr. et al. |
| 8,484,511 B2 | 7/2013 | Engel et al. |
| 8,516,529 B2 | 8/2013 | Lajoie et al. |
| 8,561,113 B2 | 10/2013 | Cansler et al. |
| 8,571,931 B2 | 10/2013 | Riedl et al. |
| 8,621,501 B2 | 12/2013 | Matheny et al. |
| 8,769,559 B2 | 7/2014 | Moon et al. |
| 2001/0001160 A1 | 5/2001 | Shoff et al. |
| 2001/0013123 A1 | 8/2001 | Freeman et al. |
| 2002/0026496 A1 | 2/2002 | Boyer et al. |
| 2002/0032754 A1 | 3/2002 | Logston et al. |
| 2002/0049902 A1 | 4/2002 | Rhodes |
| 2002/0059577 A1 | 5/2002 | Lu et al. |
| 2002/0059602 A1 | 5/2002 | MacRae et al. |
| 2002/0059619 A1 | 5/2002 | Lebar |
| 2002/0069404 A1 | 6/2002 | Copeman et al. |
| 2002/0073419 A1 | 6/2002 | Yen et al. |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0095684 A1 | 7/2002 | St. John et al. |
| 2002/0100063 A1 | 7/2002 | Herigstad et al. |
| 2002/0104083 A1 | 8/2002 | Hendricks et al. |
| 2002/0104096 A1 | 8/2002 | Cramer et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0129368 A1* | 9/2002 | Schlack ............... G06Q 30/02 725/46 |
| 2002/0144263 A1 | 10/2002 | Eldering et al. |
| 2002/0147984 A1 | 10/2002 | Tomsen et al. |
| 2002/0154655 A1 | 10/2002 | Gummalla et al. |
| 2002/0163928 A1 | 11/2002 | Rudnick et al. |
| 2002/0166119 A1 | 11/2002 | Cristofalo |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2003/0004810 A1 | 1/2003 | Eldering |
| 2003/0005446 A1 | 1/2003 | Jaff et al. |
| 2003/0018977 A1 | 1/2003 | McKenna |
| 2003/0020744 A1 | 1/2003 | Ellis et al. |
| 2003/0030751 A1 | 2/2003 | Lupulescu et al. |
| 2003/0033199 A1 | 2/2003 | Coleman |
| 2003/0056217 A1 | 3/2003 | Brooks |
| 2003/0077067 A1 | 4/2003 | Wu et al. |
| 2003/0093311 A1 | 5/2003 | Knowlson |
| 2003/0093784 A1 | 5/2003 | Dimitrova et al. |
| 2003/0093790 A1 | 5/2003 | Logan et al. |
| 2003/0093792 A1 | 5/2003 | Labeeb et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115601 A1 | 6/2003 | Palazzo et al. |
| 2003/0115612 A1 | 6/2003 | Mao et al. |
| 2003/0135513 A1 | 7/2003 | Quinn et al. |
| 2003/0140351 A1 | 7/2003 | Hoarty et al. |
| 2003/0145323 A1 | 7/2003 | Hendricks et al. |
| 2003/0149975 A1 | 8/2003 | Eldering et al. |
| 2003/0149990 A1 | 8/2003 | Anttila et al. |
| 2003/0149993 A1 | 8/2003 | Son et al. |
| 2003/0172374 A1* | 9/2003 | Vinson ................ G06Q 30/02 725/9 |
| 2003/0172376 A1 | 9/2003 | Coffin |
| 2003/0177495 A1 | 9/2003 | Needham et al. |
| 2003/0198461 A1 | 10/2003 | Taylor et al. |
| 2003/0217365 A1 | 11/2003 | Caputo |
| 2003/0220100 A1 | 11/2003 | McElhatten et al. |
| 2003/0229681 A1 | 12/2003 | Levitan |
| 2003/0237090 A1 | 12/2003 | Boston et al. |
| 2004/0034873 A1 | 2/2004 | Zenoni |
| 2004/0047599 A1 | 3/2004 | Grzeczkowski |
| 2004/0060076 A1 | 3/2004 | Song |
| 2004/0070678 A1 | 4/2004 | Toyama et al. |
| 2004/0073915 A1 | 4/2004 | Dureau |
| 2004/0078809 A1 | 4/2004 | Drazin |
| 2004/0103429 A1 | 5/2004 | Carlucci et al. |
| 2004/0109672 A1 | 6/2004 | Kim et al. |
| 2004/0117817 A1 | 6/2004 | Kwon et al. |
| 2004/0133467 A1 | 7/2004 | Siler |
| 2004/0138909 A1 | 7/2004 | Mayer |
| 2004/0148625 A1* | 7/2004 | Eldering et al. .......... 725/34 |
| 2004/0163109 A1 | 8/2004 | Kang et al. |
| 2004/0163111 A1 | 8/2004 | Palazzo et al. |
| 2004/0177383 A1 | 9/2004 | Martinolich et al. |
| 2004/0181811 A1 | 9/2004 | Rakib |
| 2004/0186774 A1 | 9/2004 | Lee |
| 2004/0194134 A1 | 9/2004 | Gunatilake et al. |
| 2004/0199789 A1 | 10/2004 | Shaw et al. |
| 2004/0230994 A1 | 11/2004 | Urdang et al. |
| 2005/0022237 A1 | 1/2005 | Nomura |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0039205 A1 | 2/2005 | Riedl |
| 2005/0047596 A1 | 3/2005 | Suzuki |
| 2005/0055685 A1 | 3/2005 | Maynard et al. |
| 2005/0060742 A1* | 3/2005 | Riedl et al. ................. 725/34 |
| 2005/0060745 A1 | 3/2005 | Riedl et al. |
| 2005/0086334 A1 | 4/2005 | Aaltonen et al. |
| 2005/0086691 A1 | 4/2005 | Dudkiewicz et al. |
| 2005/0105396 A1 | 5/2005 | Schybergson |
| 2005/0114141 A1 | 5/2005 | Grody |
| 2005/0114900 A1 | 5/2005 | Ladd et al. |
| 2005/0123001 A1 | 6/2005 | Craven et al. |
| 2005/0138656 A1 | 6/2005 | Moore et al. |
| 2005/0144635 A1 | 6/2005 | Boortz |
| 2005/0160308 A1 | 7/2005 | Elcock et al. |
| 2005/0198686 A1 | 9/2005 | Krause et al. |
| 2005/0210502 A1* | 9/2005 | Flickinger et al. ............ 725/34 |
| 2005/0223409 A1 | 10/2005 | Rautila et al. |
| 2005/0229209 A1* | 10/2005 | Hildebolt et al. ............ 725/42 |
| 2005/0234998 A1 | 10/2005 | Lesandrini et al. |
| 2005/0235318 A1 | 10/2005 | Grauch et al. |
| 2005/0251827 A1 | 11/2005 | Ellis et al. |
| 2005/0262542 A1 | 11/2005 | Deweese et al. |
| 2005/0273819 A1 | 12/2005 | Knudson et al. |
| 2005/0276284 A1 | 12/2005 | Krause et al. |
| 2005/0289588 A1 | 12/2005 | Kinnear |
| 2005/0289618 A1 | 12/2005 | Hardin |
| 2006/0019702 A1 | 1/2006 | Anttila et al. |
| 2006/0031883 A1 | 2/2006 | Ellis et al. |
| 2006/0036750 A1 | 2/2006 | Ladd et al. |
| 2006/0037060 A1 | 2/2006 | Simms et al. |
| 2006/0080408 A1 | 4/2006 | Istvan et al. |
| 2006/0117341 A1 | 6/2006 | Park |
| 2006/0130113 A1 | 6/2006 | Carlucci et al. |
| 2006/0171390 A1 | 8/2006 | La |
| 2006/0171423 A1 | 8/2006 | Helms et al. |
| 2006/0190336 A1* | 8/2006 | Pisaris-Henderson et al. ................ 705/14 |
| 2006/0197828 A1 | 9/2006 | Zeng et al. |
| 2006/0218604 A1 | 9/2006 | Riedl et al. |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0259924 A1 | 11/2006 | Boortz et al. |
| 2006/0277569 A1 | 12/2006 | Smith |
| 2006/0288374 A1 | 12/2006 | Ferris et al. |
| 2006/0294259 A1 | 12/2006 | Matefi et al. |
| 2007/0022459 A1 | 1/2007 | Gaebel et al. |
| 2007/0029379 A1 | 2/2007 | Peyer |

(56) References Cited

U.S. PATENT DOCUMENTS

| | | |
|---|---|---|
| 2007/0033531 A1 | 2/2007 | Marsh |
| 2007/0061023 A1 | 3/2007 | Hoffberg et al. |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0094692 A1 | 4/2007 | De |
| 2007/0101370 A1 | 5/2007 | Calderwood |
| 2007/0113243 A1 | 5/2007 | Brey |
| 2007/0115389 A1 | 5/2007 | McCarthy et al. |
| 2007/0118852 A1 | 5/2007 | Calderwood |
| 2007/0150919 A1 | 6/2007 | Morishita |
| 2007/0157242 A1 | 7/2007 | Cordray et al. |
| 2007/0157262 A1 | 7/2007 | Ramaswamy et al. |
| 2007/0180230 A1 | 8/2007 | Cortez |
| 2007/0204310 A1 | 8/2007 | Hua et al. |
| 2007/0217436 A1 | 9/2007 | Markley et al. |
| 2007/0233857 A1 | 10/2007 | Cheng et al. |
| 2007/0239536 A1 | 10/2007 | Bollapragada |
| 2007/0244760 A1 | 10/2007 | Bodnar et al. |
| 2007/0276926 A1 | 11/2007 | Lajoie et al. |
| 2007/0280298 A1 | 12/2007 | Hearn et al. |
| 2008/0016526 A1 | 1/2008 | Asmussen |
| 2008/0022309 A1 | 1/2008 | Begeja et al. |
| 2008/0052157 A1 | 2/2008 | Kadambi et al. |
| 2008/0092181 A1 | 4/2008 | Britt |
| 2008/0115169 A1 | 5/2008 | Ellis et al. |
| 2008/0124056 A1 | 5/2008 | Concotelli |
| 2008/0147497 A1* | 6/2008 | Tischer .................... 705/14 |
| 2008/0155588 A1* | 6/2008 | Roberts ............ G06Q 30/00 725/34 |
| 2008/0163305 A1 | 7/2008 | Johnson et al. |
| 2008/0170551 A1 | 7/2008 | Zaks |
| 2008/0192820 A1 | 8/2008 | Brooks et al. |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0271070 A1 | 10/2008 | Kanojia et al. |
| 2008/0273591 A1 | 11/2008 | Brooks et al. |
| 2008/0306903 A1 | 12/2008 | Larson et al. |
| 2008/0307454 A1* | 12/2008 | Ahanger ............ G06Q 30/02 725/36 |
| 2008/0313671 A1 | 12/2008 | Batrouny et al. |
| 2008/0313691 A1 | 12/2008 | Cholas et al. |
| 2009/0006145 A1 | 1/2009 | Duggal et al. |
| 2009/0030802 A1 | 1/2009 | Plotnick et al. |
| 2009/0086643 A1 | 4/2009 | Kotrla et al. |
| 2009/0132346 A1 | 5/2009 | Duggal et al. |
| 2009/0133048 A1 | 5/2009 | Gibbs et al. |
| 2009/0150917 A1 | 6/2009 | Huffman et al. |
| 2009/0187939 A1 | 7/2009 | Lajoie |
| 2009/0210899 A1 | 8/2009 | Lawrence-Apfelbaum et al. |
| 2009/0222316 A1 | 9/2009 | Boinepalli et al. |
| 2009/0319379 A1 | 12/2009 | Joao |
| 2009/0320059 A1* | 12/2009 | Bolyukh .................... 725/32 |
| 2010/0005527 A1 | 1/2010 | Jeon |
| 2010/0027560 A1 | 2/2010 | Yang et al. |
| 2010/0057560 A1 | 3/2010 | Skudlark et al. |
| 2010/0107194 A1 | 4/2010 | McKissick et al. |
| 2010/0114696 A1 | 5/2010 | Yang |
| 2010/0115091 A1 | 5/2010 | Park et al. |
| 2010/0122276 A1 | 5/2010 | Chen |
| 2010/0125658 A1 | 5/2010 | Strasters |
| 2010/0161492 A1 | 6/2010 | Harvey et al. |
| 2010/0175084 A1 | 7/2010 | Ellis et al. |
| 2010/0175584 A1 | 7/2010 | Kusaka et al. |
| 2010/0218231 A1 | 8/2010 | Frink et al. |
| 2010/0251304 A1 | 9/2010 | Donoghue et al. |
| 2010/0251305 A1 | 9/2010 | Kimble |
| 2010/0262488 A1 | 10/2010 | Harrison et al. |
| 2010/0269131 A1 | 10/2010 | Newberry et al. |
| 2010/0275226 A1 | 10/2010 | Kitazato |
| 2010/0280641 A1 | 11/2010 | Harkness et al. |
| 2010/0293047 A1 | 11/2010 | Schwarz et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0110515 A1 | 5/2011 | Tidwell et al. |
| 2011/0178880 A1 | 7/2011 | Karaoguz et al. |
| 2011/0178943 A1 | 7/2011 | Motahari et al. |
| 2011/0231265 A1 | 9/2011 | Brown et al. |
| 2011/0265116 A1 | 10/2011 | Stern et al. |
| 2011/0307339 A1 | 12/2011 | Russell et al. |
| 2011/0307920 A1 | 12/2011 | Blanchard et al. |
| 2011/0317977 A1 | 12/2011 | Harris |
| 2012/0011269 A1 | 1/2012 | Krikorian et al. |
| 2012/0030363 A1 | 2/2012 | Conrad |
| 2012/0084813 A1 | 4/2012 | Dmitriev et al. |
| 2012/0110620 A1 | 5/2012 | Kilar et al. |
| 2012/0124161 A1 | 5/2012 | Tidwell et al. |
| 2012/0124606 A1 | 5/2012 | Tidwell et al. |
| 2012/0159539 A1 | 6/2012 | Berberet et al. |
| 2013/0041747 A1 | 2/2013 | Anderson et al. |
| 2013/0114940 A1 | 5/2013 | Merzon et al. |
| 2013/0227608 A1 | 8/2013 | Evans et al. |
| 2014/0020017 A1 | 1/2014 | Stern et al. |

OTHER PUBLICATIONS

Tandberg Television specification entitled "AdPoint.RTM. Advanced Advertising Platform" dated Mar. 2008, 2 pages.

UTF-32, IBM, retrieved from http://publib.boulder.ibm.com/infocenter/iseries/v5r3/index.jsp?topic=%2Fnls%2Frbagsutf32.htm. on Aug. 28, 2013.

\* cited by examiner

ADVERTISMENT 1:    $\begin{bmatrix} AGE: 36\text{-}45 & 0.8 \\ AVG.\ INCOME & 0.2 \end{bmatrix}$    $\begin{bmatrix} 0.1 \\ 0 \end{bmatrix}$ ADVERTISMENT 2:    $\begin{bmatrix} CODE: COUNTRY & 0.6 \\ SQUIRES & \\ HIGH\ INCOME & 0.2 \\ MALE & 0.2 \end{bmatrix}$    $\begin{bmatrix} 0.3 \\ \\ 0 \\ 0 \end{bmatrix}$ ADVERTISMENT 3:    $\begin{bmatrix} FEMALE & 0.5 \\ AGE: 26\text{-}35 & 0.5 \end{bmatrix}$    $\begin{bmatrix} 0 \\ 0 \end{bmatrix}$

*FIG. 6*

METHODS AND APPARATUS FOR TARGETED SECONDARY CONTENT INSERTION

PRIORITY AND RELATED APPLICATIONS

This application is a continuation of and claims priority to U.S. patent application Ser. No. 12/503,710 filed Jul. 15, 2009 and issuing as U.S. Pat. No. 8,813,124 on Aug. 19, 2014 of the same title, and incorporated herein by reference in its entirety. This application is related to commonly owned U.S. patent application Ser. No. 12/503,749 filed on Jul. 15, 2009 and entitled "METHODS AND APPARATUS FOR EVALUATING AN AUDIENCE IN A CONTENT-BASED NETWORK" and to commonly owned U.S. patent application Ser. No. 12/503,772 filed on Jul. 15, 2009 and entitled "METHODS AND APPARATUS FOR CLASSIFYING AN AUDIENCE IN A CONTENT-BASED NETWORK", both of which are incorporated herein by reference in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention relates generally to the field of computer-assisted data manipulation and analysis. Specifically, in one exemplary aspect, the invention relates to methods and apparatus for collection and classification of data regarding an audience in a content-based network such as a cable television or satellite network.

DESCRIPTION OF RELATED TECHNOLOGY

"Nielsen Ratings" are a well known system of evaluating the viewing habits of cross sections of the population. When collecting Nielsen ratings, companies use statistical techniques to develop a sample population which is a cross section of a larger national population. Theoretically, the viewing habits of the sample population will mirror the larger population. The companies then measure the populations viewing habits to identify, among other things, what programs the population is watching as well as the time and frequency at which those programs are watched. This information is then extrapolated to gain insight on the viewing habits of the larger population. Historically, the Nielsen system has been the primary source of audience measurement information in the television industry. The Nielsen system, therefore, affects various aspects of television including inter alia, advertising rates, schedules, viability of particular shows, etc., and has been also recently expanded from measuring an audience of program content to measuring an audience of advertising (i.e., Nielsen ratings may be provided for advertisements themselves).

The Nielson system collects data regarding audiences via either (i) by asking viewers of various demographics to keep a written record of the television shows they watch throughout the day and evening, or (ii) by using "set meters," which are small devices connected to televisions in selected homes which electronically gather the viewing habits of the home and transmit the information nightly to Nielsen or a proxy entity over a connected phone line or other connection.

There are several disadvantages to the Nielsen approach. First, the sample of viewers selected may not be fairly representative of the population of viewers (or the subset of cable viewers) as a whole. For example, in a cable network comprising four million cable viewers, a sample of any 100,000 viewers may exhibit different average viewing habits than the averages associated with the other 3,900,000 cable viewers who are not in the sample.

Second, static delivery makes it difficult to precisely target an audience that is known to be in the market. For example, suppose that the ideal target for a sports car advertisement is the set of all consumers who like and would be interested in buying sports cars. If all that is known from Nielsen data is that 10% of the sample group has watched the auto-racing channel for over three hours in the last month, this may not perfectly correlate with set of consumers who like sports cars. This may be the case, for example, if there are some consumers who are in the market for sports cars but who never watch the auto racing channel, or if there are some viewers of the auto racing channel who have no interest in buying or owning sports cars. As such, patterns based on viewership data often imprecisely identify the desired audience.

Furthermore, the Nielson system is disadvantageously program-specific. Program-specific audience data collection is problematic from the standpoint that this program-coupled approach is only as good as the underlying demographic correlation model. For example, assuming a demographic of 18-30 year old females typically tune in to American Idol each broadcast (e.g., Monday at 8:00 pm), this same demographic may not have any interest in watching the program immediately preceding or following American Idol, and hence may tune away (or delay tuning to that channel until the start of America Idol).

Another disability of the Nielson approach is that it tends to aggregate data or results for given premises (e.g., households) as opposed to providing data for specific users of that premises. For example, the switching activity associated with a given settop box for a family of five represents switching activity for each member of that family (including perhaps viewing of cartoons for a child, teen-related programs for a teenager, and adult-related content for one or more adults). However, Nielsen systems are at present incapable of determining precisely which member(s) of that household viewed which programs or advertisements. Hence, the data obtained using Nielsen techniques is somewhat of an amalgam of the data for individual users, and various combinations thereof.

For media content providers such as cable and satellite companies and the like, a major issue is how to more accurately target population segments for advertising campaigns based on particular characteristics of an audience, opportunities for insertion (or replacement) of an advertisement, and other factors. It is most desirable for advertisers to have advertisements for products that are targeted to a particular demographic to be viewed by that demographic.

Therefore, there is a need for improved methods and apparatus which do not require or rely solely on population sampling or trend analysis based on a sample population, in order to more accurately generate and analyze audience measurement data. Such improved methods and apparatus would ideally be able to gather audience information in real-time or near-real time with associated viewership actions of actual viewers. Exemplary methods would be able to obtain audience information directly from customer's premises equipment (i.e. set top boxes, cable modems etc.), for each individual box or even on a per-user basis where possible, thereby allowing a content provider to gather specific information in large quantities across a broad geographical area. Ideally, these methods and apparatus would be able to monitor or use data from multiple sources of content to which viewership behavior relates, and also maintain subscriber anonymity or privacy (i.e., no use of personally identifiable information).

These features would also be provided leveraging substantially extant network infrastructure and components, and would be compatible with a number of different client device and delivery systems including both wired and wireless technologies.

SUMMARY OF THE INVENTION

The present invention addresses the foregoing needs by providing, inter alia, methods and apparatus adapted to increase the effectiveness of advertising or promotional content to be delivered over a network to one or more network devices and associated users.

In a first aspect of the invention, content management apparatus for use within a content delivery network is disclosed. In one embodiment, the apparatus comprises: an advertising subsystem having an advertising content store, said advertising subsystem being configured to store a plurality of advertisements having descriptive information associated therewith, and to identify at least one advertising placement opportunity in delivered content; a data collection subsystem; a processing subsystem in data communication with said collection subsystem; and a data storage subsystem in data communication with said processing subsystem. The data collection subsystem is configured to gather data related to an audience associated with said placement opportunity; and the processing subsystem is adapted to utilize said descriptive information relating to said plurality of advertisements and said gathered data to selectively identify ones of said advertisements that are best suited for placement within said opportunity.

In one variant, said data related to an audience comprises individual user data, and said individual user data is stored in said data storage subsystem based on at least one respective anonymous identifier. The at least one anonymous identifier may comprise for example a cryptographic hash of at least one of: (i) a MAC address associated with a CPE of a user; and (ii) a tuner-related variable.

In another variant, said plurality of advertisements comprises advertisements from various different advertisers who have been pre-qualified by an operator of the content management apparatus.

In a further variant, the descriptive information comprises a plurality of weighted attributes relating to a desired or target audience of the advertisement with which the descriptive information is associated.

In yet another variant, the content delivery network comprises an Internet Protocol (IP) network, at least a portion of the advertisements being sent to the store via the IP network.

In a second aspect of the invention, a method of providing targeted advertisements in a content delivery network is disclosed. In one embodiment, the method comprises: obtaining a plurality of advertisement segments, each one of the plurality of advertisement segments further comprising information descriptive of a target audience thereof; identifying at least one opportunity for insertion of at least one of the plurality of advertisement segments into a content stream; characterizing an audience associated with the at least one opportunity; determining a relationship between the at least one opportunity and the plurality of advertisement segments based at least in part on the information and the characterization of the audience; selecting for the at least one opportunity at least one of the plurality of advertisement segments; and inserting the selected at least one advertisement segment at the at least one opportunity.

In one variant, the information comprises a plurality of aspects, each aspect having a weighted value and range of allowable variation associated therewith. For example, the aspects might comprise one or more of psychographic, demographic, and behavioral aspects.

Similarly, the characterization of the audience might comprise characterization according to one or more of psychographic, demographic, and behavioral attributes.

In another variant, the act of selecting is based at least in part on one or more factors regarding revenue or profit associated with ones of the advertisements.

In yet another variant, the at least one opportunity comprises at least one insertion opportunities in a DVR or nPVR presentation of primary content.

In still another variant, the at least one opportunity comprises at least one insertion opportunities in an electronic programming guide (EPG) or telephony user interface.

In a further variant, the at least one opportunity comprises an opportunity for display within only a portion of a display area on a display device displaying a linear broadcast presentation of primary content.

Alternatively, the at least one opportunity comprises at least one insertion opportunities in a VoD presentation of primary content.

In a third aspect of the invention, computer readable apparatus comprising media is disclosed. In one embodiment, the media is adapted to contain a computer program having a plurality of instructions which, when executed: obtain a request for insertion of an advertisement segment, the request comprising a plurality of attributes; access a plurality of available advertisement segments, the plurality of available advertisement segments each comprising information relating to a respective target audience; determine a similarity of the plurality of attributes of the request to respective ones of the target audiences of the plurality of available advertisement segments; and provide at least one of the available advertisement segments having a predetermined threshold of similarity to the plurality of attributes of the request.

In one variant, the information comprises a profile with a plurality of aspects which correlate to at least some of the plurality of aspects of the request. The plurality of aspects of the profile each have a mathematical weighing factor assigned thereto, and the review further comprises applying the weighing factors to respective ones of the plurality of aspects for each of the available advertisement segments.

In another variant, the application of the weighting factor to the plurality of characteristics further comprises permitting a prescribed level of variance.

In a fourth aspect of the invention, apparatus for selecting one of a plurality of secondary content for targeted insertion thereof into primary content is disclosed. In one embodiment, the apparatus comprises: a storage apparatus; a first interface capable of receiving at least information regarding the plurality of secondary content, the information being stored at the storage apparatus; a second interface capable of receiving a request for secondary content at an insertion opportunity, the request comprising at least information regarding an audience of the insertion opportunity; and a processor, the processor being adapted to run at least one computer program. When executed, the program: determines a level of similarity of individual ones of the plurality of secondary content to the information regarding the audience at the insertion opportunity; and selects one of the plurality of secondary content based at least in part on the determination.

In one variant, the apparatus further comprises a third interface adapted to provide information regarding the selected one of the plurality of secondary content to an entity adapted to provide the selected one of the plurality of secondary content to an initiator of the request.

In another variant, the secondary content comprises advertising or promotional content.

In another variant, the secondary content comprises an info-mercial that is contextually associated with the primary content.

In a further variant, the information regarding the plurality of secondary content further comprises information regarding one or more restrictions to the selection of the content, and the selection occurs taking into account the one or more restrictions. For example, at least one of the one or more restrictions comprises restricting the secondary content to only requests for secondary content to be displayed according to certain ones of a plurality of delivery platforms. Alternatively, at least one of the one or more restrictions comprises restricting the secondary content according to a billing scheme.

In a fifth aspect of the invention, a method of doing business in a content-based network is disclosed. In one embodiment, the method comprises: receiving a request for at least one programming segment at a placement opportunity; determining one or more characteristics of the placement opportunity; selecting at least one of a plurality of programming segments for insertion at the placement opportunity, the selection being based at least in part on one or more characteristics of the placement opportunity; inserting the selected at least one of the plurality of programming segments at the placement opportunity; and receiving consideration from an entity associated with the selected at least one programming segment based at least in part on the inserting.

In one variant, the method further comprises receiving one or more characteristics of the plurality of programming segments, the one or more characteristics corresponding to the one or more characteristics of the placement opportunity.

In another variant, the act of selecting further comprises: comparing the one or more characteristics of the placement opportunity with the one or more characteristics of the plurality of programming segments; and identifying individual ones of the plurality of programming segments having a threshold level of similarity to the placement opportunity.

In yet another variant, each one of the one or more characteristics of the plurality of segments is assigned a weighted value and variance, the weighted value and variance being utilized in the act of comparing. The selected at least one of the plurality of programming segments comprises selection of a programming segment having a highest level of similarity to the placement opportunity.

In another variant, the selected at least one of the plurality of programming segments comprises selection of a programming segment based at least in part on one or more revenue or profit considerations.

In a further variant, the plurality of programming segments comprise available advertisements. In yet another variant, the weight value may be dynamically changed over time to ensure all of a given set of content is played.

In a sixth aspect of the invention, CPE adapted to collect and transmit data useful in targeted advertising or promotion delivery is disclosed. In one embodiment, the CPE comprises a cable or satellite digital settop box having client software running thereon, the client software being configured to provide requisite data to a network (e.g., headend) system via e.g., upstream /OOB communications.

These and other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 6 is a graphical representation illustrating three exemplary descriptive data files for three exemplary advertisements.

FIG. 7 is a ladder diagram illustrating an exemplary communication flow between various entities of the audience classification system of FIG. 2a.

DETAILED DESCRIPTION OF THE INVENTION

Figure 1:
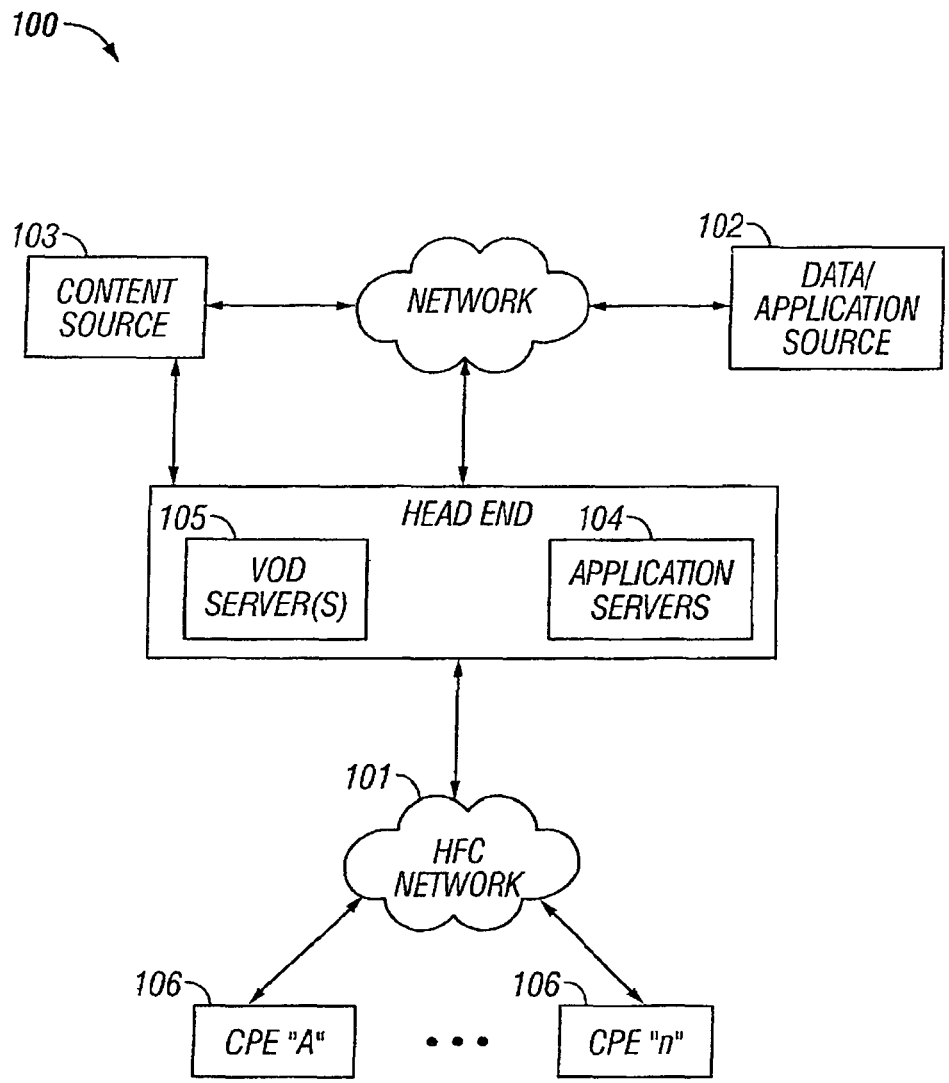
FIG. 1 is a functional block diagram illustrating an exemplary HFC cable network configuration useful with the present invention.

Reference is now made to the drawings, wherein like numerals refer to like parts throughout.

As used herein, the term "advertisement" refers to (without limitation) advertising, promotions, info-mercials, related segments or special features (e.g., the making of "X", where X is the primary content), as well as other types of secondary content.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another form comprises a subscription or installment plan. Yet a further form comprises providing a limited time option Myriad other forms of consideration will be appreciated by those of ordinary skill given the present disclosure.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multifunction system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional headends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to the schemes.

As used herein, the term "network interface" refers to any signal, data, or software interface with a component, network or process.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi (such as IEEE-Std. 802.11 or related standards including 802.11a/b/g/n), Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the invention discloses methods and apparatus for the identification and insertion of content targeted to a particular audience within a content-based network, such as a cable television or satellite network. In one embodiment, the content is identified by analyzing audience or viewer qualities (i.e., psychographic, geographic, or demographic, characteristic or classifications) at a particular insertion opportunity using an advertisement management system (and associated advertisement decision maker process). The audience information can in one embodiment be gathered in real-time directly from users' CPE (i.e. set top boxes, cable modems, PC, etc.), thereby allowing information to be gathered which is specific to actual content viewers. Historical or other information relating to particular subscribers (or subscribers in general, or even the broader general population) may also be utilized in characterizing an audience.

The advertisement management system then, in one embodiment, uses the gathered audience information to correlate particular advertisements or other content thereto. In one variant, an algorithm is used to analyze audience qualifiers (i.e., attributes of an audience or its behavior), and determine the "proximity" of a given audience (e.g., that currently viewing a program where an impending placement opportunity will occur) to a set of audience qualifiers of a target audience of an advertisement. The placement opportunity can then be optimized for one or more variables (e.g., proximity, revenue, impressions, etc.) by selecting the best fitting advertisement for that opportunity.

The aforementioned methods and apparatus can advantageously provide content across multiple delivery platforms utilizing substantially extant network infrastructure and components compatible with a number of different client device and delivery systems including both wired and wireless technologies.

Subscriber privacy and anonymity is also optionally maintained via e.g., hashing or encrypting data relating to the CPE and/or subscriber, thus ensuring that stored data is not traceable to a specific user account. In alternative embodiments, only information designated by a consumer is eligible for content collection and/or analysis. In this manner, subscriber privacy is effectively safeguarded, and user control of their private information (including for example preferences or user profile) is protected as well.

Detailed Description of Exemplary Embodiments

Exemplary embodiments of the audience classification apparatus and methods of the present invention are now described in detail. While these exemplary embodiments are described in the context of the aforementioned hybrid fiber coax (HFC) cable architecture having a multiple systems operator (MSO), digital networking capability, and plurality of client devices/CPE, the general principles and advantages of the invention may be extended to other types of networks and architectures, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over satellite or millimeter wave-based networks having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Also, while certain aspects are described primarily in the context of the well known IP or Internet Protocol (described in, inter alia, RFC 791 and 2460), it will be appreciated that the present invention may utilize other types of protocols (and in fact bearer networks to include other internets and intranets) to implement the described functionality.

Bearer Network Architecture—

FIG. 1 illustrates a typical content-based network configuration with which the apparatus and methods of the present invention may be used. The various components of the network 100 include (i) one or more data and application origination points 102; (ii) one or more content sources 103; (iii) one or more application distribution servers 104; (iv) one or more VoD servers 105, and (v) consumer premises equipment (CPE) 106. The distribution server(s) 104, VoD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VoD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VoD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VoD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers premises" (or other locations, whether local or remote to the servers 104, 105) that can be accessed by a distribution server 104 or VOD server 105. Exemplary embodiments of a "converged" CPE (i.e., CD) of the invention are also described subsequently herein.

Figure 1A:
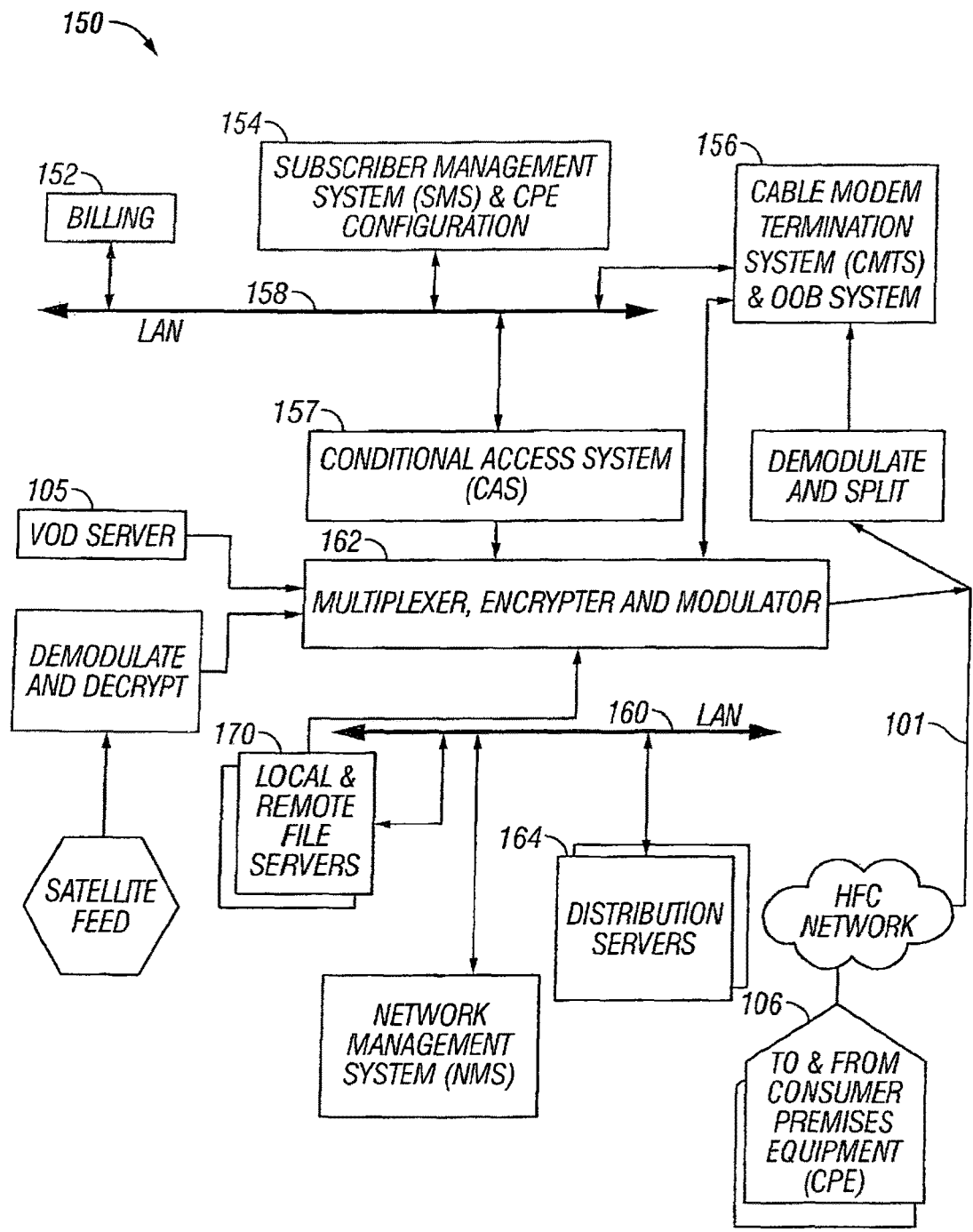
FIG. 1a is a functional block diagram illustrating one exemplary HFC cable network headend configuration useful with the present invention.

Referring now to FIG. 1a, one exemplary embodiment of headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "Apparatus and Methods for Multi-Stage Multiplexing in a Network" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed-forward" mechanisms for transferring information between multiplexing stages.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
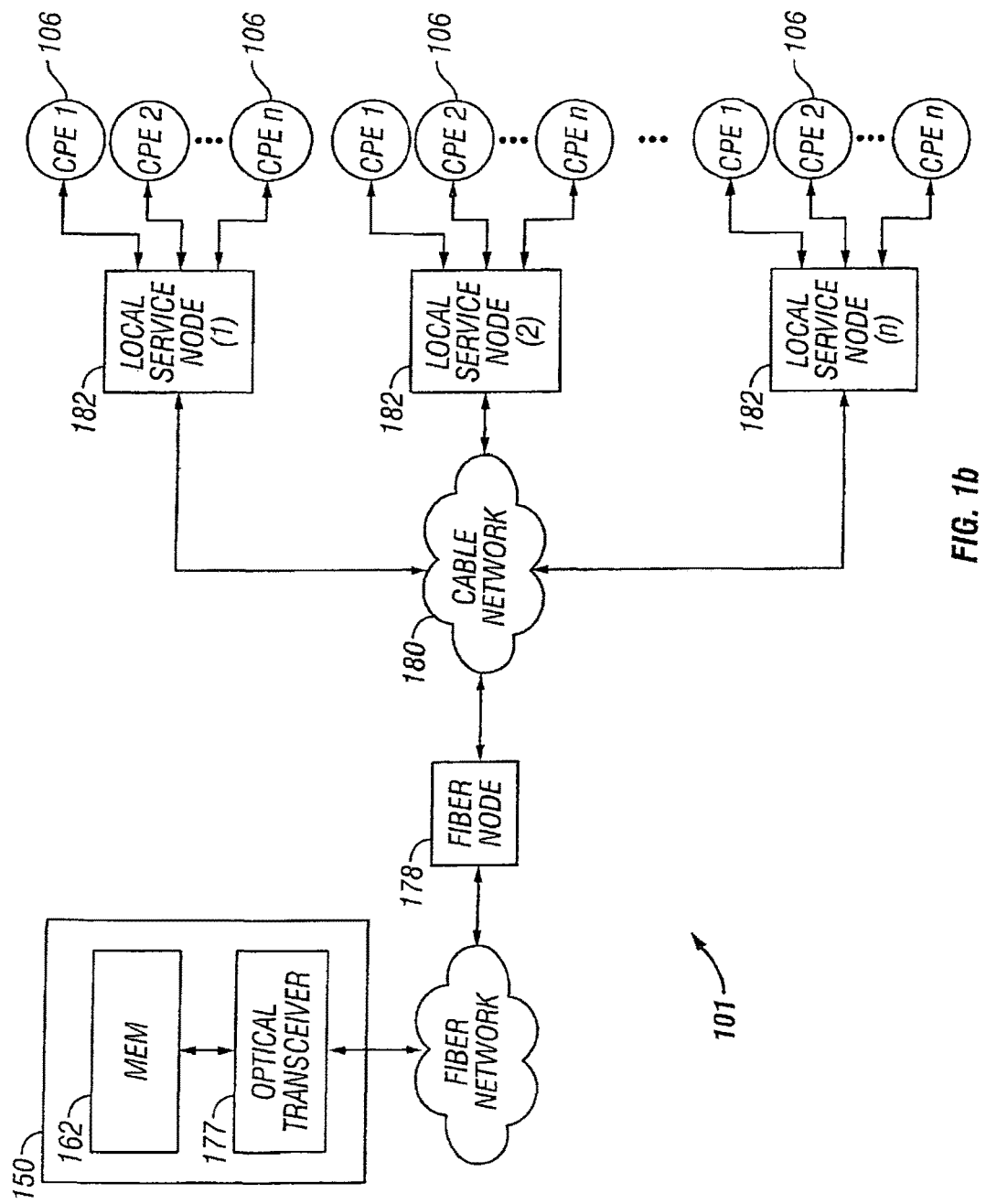
FIG. 1b is a functional block diagram illustrating one exemplary local service node configuration useful with the present invention.
Figure 1C:
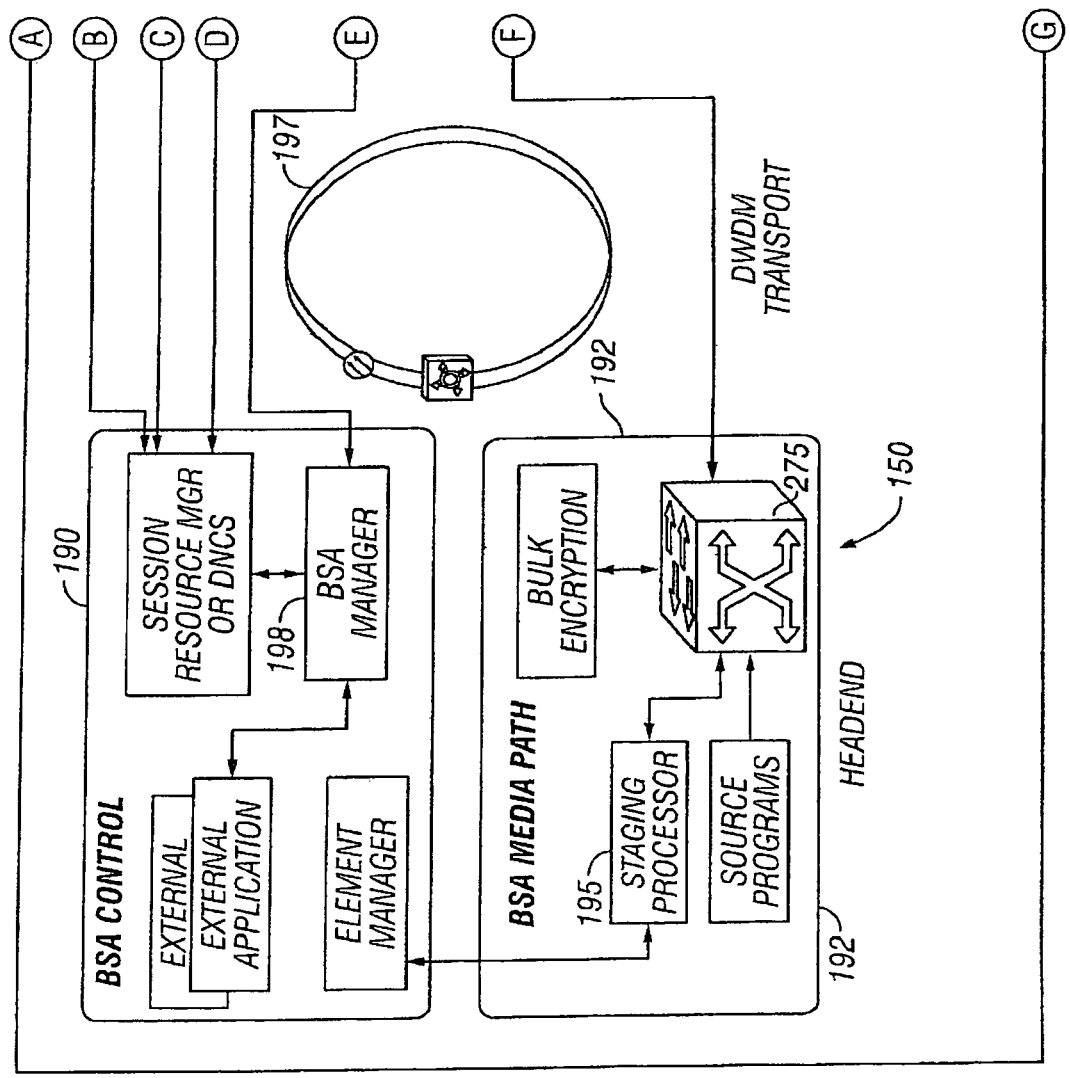
FIG. 1c is a functional block diagram illustrating one exemplary broadcast switched architecture (BSA) network useful with the present invention.
Figure 1C:
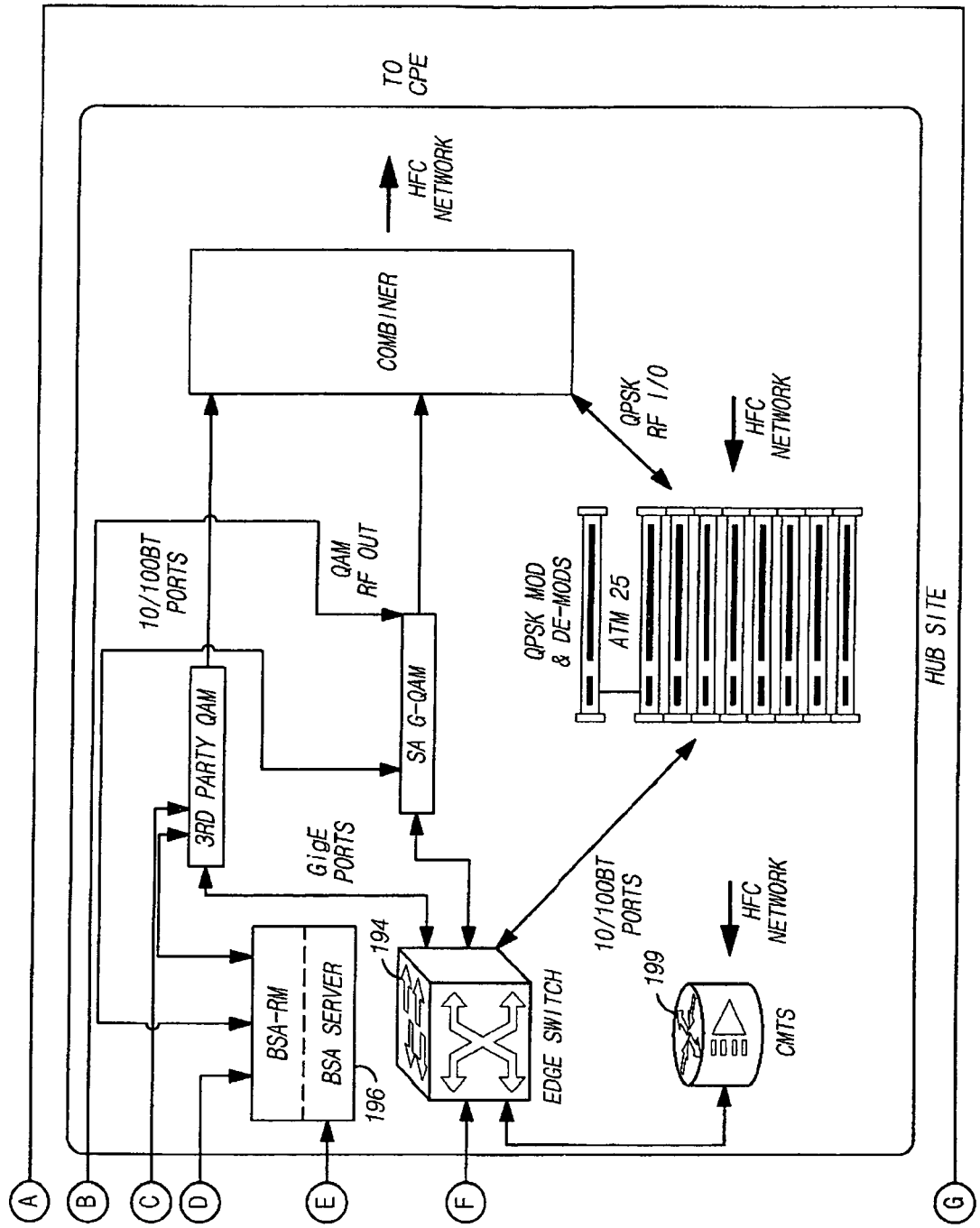

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these elements cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "Technique for Effectively Providing Program Material in a Cable Television System", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a*-1*c* can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1*c*, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Audience Classification System—

Figure 2:
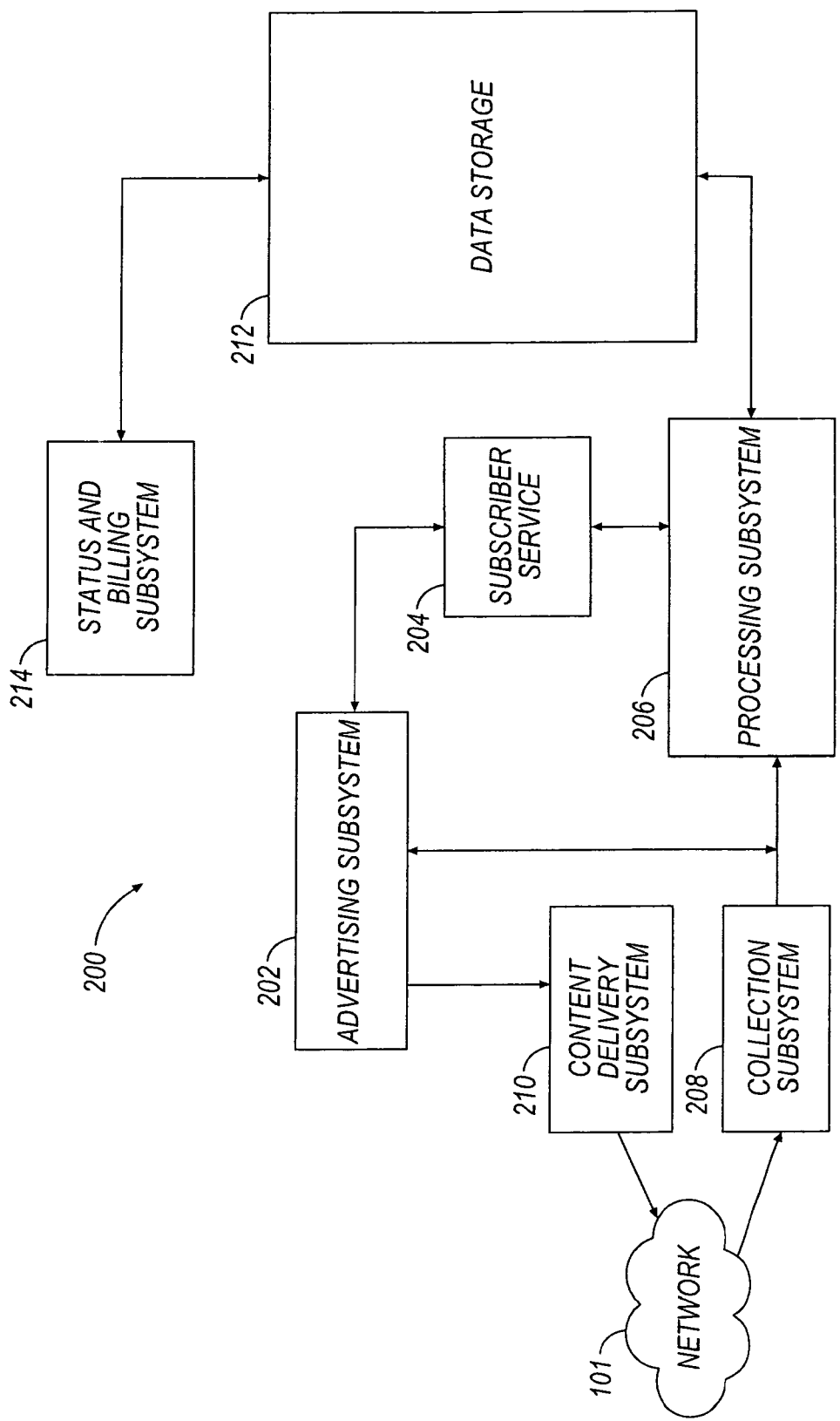
FIG. 2 is a high-level block diagram illustrating one embodiment of an audience classification system according to the present invention.

Referring now to FIG. 2, one embodiment of the network architecture specifically implementing the audience classification and targeted advertisement/promotional delivery functions of the invention is shown and described. The system 200 of FIG. 2 is in the present embodiment disposed substantially at one or more cable or satellite network headends or distribution facilities, although it will be recognized that this is in no way a requirement, and in fact the components may be distributed among various different physical locations (and connected via network for example) as desired. Moreover, different cable or satellite system headends may share components between them, and/or have multiple ones of components installed for e.g., redundancy/failover protection, different tasking or service, etc.

As shown in FIG. 2, the system 200 comprises an advertising subsystem 202, subscriber information service 204, processing subsystem 206, data collection subsystem 208, and content delivery subsystem 210, in operative communication as shown. A data storage subsystem 212 and status and billing subsystem 214 are also in communication with the processing subsystem 206. The content delivery subsystem 210 and data collection subsystem 208 are in communication with the HFC distribution network 101 to deliver content and receive data from user equipment (e.g., CPE 106) such as via an out-of-band upstream RF channel, although it will be appreciated that other approaches may be used, including for example delivery via an upstream DOCSIS channel, or even a whole separate transport such as a wireless or other IP network (not shown).

Figure 2A:
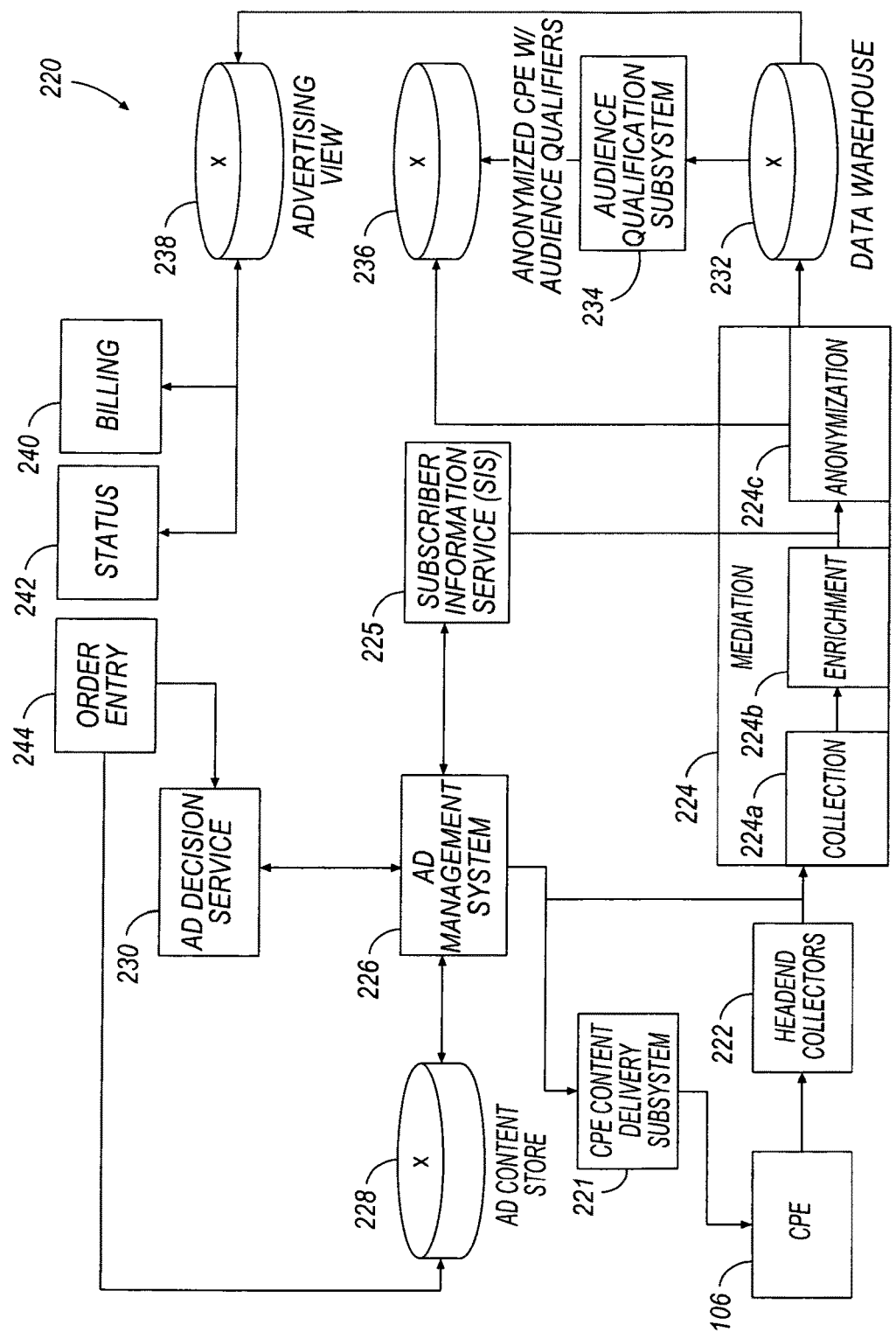
FIG. 2a is a functional block diagram illustrating an exemplary cable network implementation of the audience classification system of FIG. 2.

The operation and function of the foregoing subsystems and components is illustrated in detail with respect to one exemplary implementation (see discussion of FIG. 2*a* below), although it will be appreciated that the embodiment of FIG. 2*a* is merely one possible architecture for implementing the system 200 of FIG. 2. Moreover, various elements of the subsystems and components shown in FIG. 2 can be combined with others, or functions performed thereby distributed across different functional (e.g., hardware or software) entities already within the content delivery network.

Referring now to FIG. 2*a*, an exemplary implementation of the audience classification system according to FIG. 2 described above is given. The system 220 enables data regarding an audience to be collected and information to be derived therefrom in order to categorize or group an audience. The categories and/or groups may be used for, inter alia, generating an inventory as discussed in co-owned U.S. patent application Ser. No. 12/503,749 entitled "METHODS AND APPARATUS FOR EVALUATING AN AUDIENCE IN A CONTENT-BASED NETWORK" filed on Jul. 15, 2009, issued as U.S. Pat. No. 9,178,634 on Nov. 3, 2015, and incorporated herein by reference in its entirety. This "inventory" in one embodiment comprises a placement opportunity along with a particular audience watching that opportunity.

As illustrated, the audience classification system 220 of FIG. 2*a* generally comprises a content delivery subsystem 221 adapted to provide content to the CPE 106. The content delivery subsystem 221 may, in one embodiment, comprise a local node 182 such as that described above with respect to FIG. 1*b*. Alternatively, the content delivery subsystem 221 may comprise an entity separate from, yet in communication with the above described content-transmitting entities. The content delivery subsystem 221 is adapted to deliver "primary" and "secondary" content to a CPE 106. As described above, primary content (e.g., movies, broadcast programs, etc.) is delivered to the CPE 106 from various content sources 103. Secondary content (such as advertising or promotional content), in the illustrated embodiment, is originated from an advertisement management system (ADM) 226.

Advantageously, the methods and apparatus of the present invention can be used with any number of different advertising insertion or splicer architectures, whether analog, digital or hybrid in nature. See, for example, co-owned U.S. patent application Ser. No. 10/662,776 filed Sep. 15, 2003 entitled "SYSTEM AND METHOD FOR ADVERTISE- MENT DELIVERY WITHIN A VIDEO TIME SHIFTING ARCHITECTURE", and issued as U.S. Pat. No. 8,214,256 on Jul. 3, 2012, which is incorporated by reference herein in its entirety, for exemplary advertising insertion and splicer apparatus and methods in the context of, e.g., networked digital video recorder (nDVR) or VoD delivery paradigms.

The ADM 226 selects individual ones of a plurality of secondary content for delivery to individual ones of the CPE 106 from a secondary content store 228. The ADM 228 may, in one embodiment, be adapted to comply with the requirements set forth in the Society of Cable Telecommunications Engineers SCTE 130-1 and SCTE 130-3 Digital Program Insertion—Advertising Systems Interfaces standards, which are incorporated herein by reference in their entirety. Advertising content is placed on the content store 228 by a source of the advertising (not shown). In one embodiment, the ADM 226 is in communication with an Advertisement Decision Service 230 which determines individual ones of the plurality of secondary content from the content store 228 to deliver to the CPE 106 (via the content delivery subsystem 221) based in part on data collected from a headend collecting entity 222.

It is noted that although only one headend collector 222 is depicted in FIG. 2a, the audience classification system 220 may comprise, in one embodiment, several headend collectors 222 belonging to various MSOs. Alternatively, the headend collector 222 may comprise one or several headend collectors 222 of the same MSO.

As illustrated in FIG. 2a, the headend collecting entity 222 receives information from the CPE 106 regarding actions taken thereon with respect to content (whether secondary or primary). For example, the headend collecting entity 222 may receive information about individual user activities including, inter alia, tuning events (such as viewing a broadcast program or purchasing a VOD program), manipulation events or "trick mode" operations (such as fast forwarding, rewinding, etc.), recording events (e.g., DVR or nPVR commands), events which relate to changes in the system's configuration (for example, changes to the program channel map or changes to the services a particular CPE 106 receives), and/or "heartbeat" events such as those indicating whether a particular CPE is powered up or otherwise active/functional.

The headend collecting entity 222 may be further adapted to collect information regarding geographic location, demographic and/or psychographic information, system capabilities, the size of the audience for any particular program, etc. of the CPE 106 in communication therewith. Although only one CPE 106 is illustrated, it will be appreciated that the headend collecting entity 222 may be adapted to receive and process information from a plurality of CPE 106. Certain information regarding the CPE 106 may further be collected from the Electronic Programming Guide (EPG), web portals, cell phone usage, Customer Relationship Management Systems (CRM), billing systems, census data, Canoe Ventures data, other advertising networks, and other third party sources.

In another embodiment, the headend collecting entity 222 may also receive metadata regarding secondary content transmitted to the CPE 106. For example, the ADM 226 may transmit secondary content to the content delivery subsystem 221 (discussed above) and simultaneously send metadata regarding the secondary content to the headend collecting entity 222. Alternatively, the headend collecting entity 222 may be provided with metadata regarding all of the secondary content stored on the content store 228 before the secondary content is transmitted to the CPE 106.

In another embodiment, a content information service (CIS), subscriber information service (SIS) and/or placement opportunity information service (POIS) communicate with the ADM 226 to provide metadata and other information thereto. The CIS is an interface which describes a logical service, it may be run on any entity managing metadata or on an entity in communication with a second entity containing metadata describing the content. The CIS sources metadata to consumers (via the ADM and ADS). The CIS does not define how to move the content around, however a separate CIS implementation may be given to provide such functionality.

The headend collecting entity 222 translates the metadata to a content record describing the content to which it relates. Generally speaking. "metadata" comprises extra data not typically found in typical content (or at least not visible to the users of the network), such as for example that rendered in an XML or other such format. For each component of the content (e.g., video/audio), one or more metadata files are associated that specify the relevant search terms or primitives for that content. This metadata can be provided with the content from its source or provider (e.g., a network studio or station or the like), or alternatively added by the MSO. Alternatively, portions of the metadata can be added by multiple entities, and/or editing of another entity's metadata performed. Various permutations and mechanisms for generating, adding and editing metadata will be recognized by those of ordinary skill, and hence are not described in detail herein.

It is also appreciated that in yet another embodiment, the headend collecting entity 222 may be adapted to further receive metadata regarding primary content transmitted to the CPE via the content delivery subsystem 221 or other content providing entity (such as those disclosed above with respect to FIGS. 1a-1c). Such metadata may be useful for a variety of reasons including for example obtaining a description of a particular primary content element so that appropriate advertising can be matched thereto; see e.g., co-owned U.S. patent application Ser. No. 12/284,757 filed Sep. 24, 2008 entitled "Methods and Apparatus for User-Based Targeted Content Delivery", and issued as U.S. Pat. No. 9,071,859 on Jun. 30, 2015, which is incorporated herein by reference in its entirety, for one exemplary use of such primary metadata in connection with targeted advertising.

The headend collecting entity 222 passes the collected customer information (e.g., user preferences, activity, demographics, etc.) and metadata regarding content (primary and/or secondary) to the data collection portion 224a of the processing (e.g., mediation) entity 224. The mediation entity 224 is adapted to receive and process the collected information. In one embodiment, the mediation entity 224 synthesizes the information at an enrichment portion 224b; such synthesis may include e.g., identification of one or more patterns of interest in the aggregate data collection. This identification may be accomplished via any one of the plurality of methods for mining and examining data sets known in the arts. The patterns of interest (PI's) are theoretically arbitrary, and depend on business needs or research discovery.

A salient feature of a PI is the ability to reproduce the pattern, and in turn generate basic questions to be asked and answered of that PI (e.g., given a PI of "has internet and video", one would want to know given perhaps some other constraints, "how many of those are present?" or given this subscriber or set of subscribers (audience) is there a "match"). In other words, PI's are mechanisms for identifying from a large population of CPE reporting data on a near real-time (or real-time) basis, a relatively small subset of the CPE which exhibit a particular desired behavior. For example, PI's may indicate from among all of the CPE in a market only the ones which are doing or have performed an action to receive a specific commercial; the particular action performed which caused delivery of the commercial in this example is the PI. A PI may be expressed as an arbitrarily complex Boolean Expression against the data collected. Suppose for example set-top tuning data is being collected, a possible PI may be those households for which one STB was tuned to Fox News™ in prime time for at least one hour per day over a week long period. The PI may then be applied to the entire population of STBs, thereby extracting only those STBs that, over the last week have been Tuned to Fox News for at least one hour per day. The identified STBs are then associated to the household to which they belong in an anonymous manner.

In another example, suppose a baby food advertiser seeks to advertise in households where expecting mothers are viewing. In this instance, a relevant PI may be those (anonymous) households with STBs that had relatively less tune-away events during commercials for pregnancy tests.

The patterns of interest (PI's) may relate to only a few of the plurality of CPE 106 providing data to the headend collectors 222 and mediation entity 224. However, if a predetermined number of CPE 106 share a given pattern of interest, that pattern of interest may then be expressed as an audience qualifier. An audience qualifier is a Boolean expression (e.g., has HSD, etc.) with an arbitrarily complex set of Boolean expressions joined together. In theory an audience qualifier may be used to express literally any PI. In other words, the system is triggered to understand that there is an "audience" sharing the pattern of interest. As will be discussed in greater detail below, the audience qualifier characterized by the reproducible pattern of interest is then further categorized into one or more classifications based on the collected data. Exemplary classifications include but are not limited to psychographic variables (e.g., "prefers watching mysteries", "likely to purchase a laptop", etc.), geographic location (e.g., "within the 80027 zip code", "currently driving down I-70", etc.), demographic makeup (e.g., "age 30-35", "income $50K-$70K", etc.), or other characteristic (e.g., Claritas PRIZM code, other market segmenting service code, etc.).

Classified audience qualifiers can therefore be traced to patterns of interest, and help determine the "reach" of the audience (e.g., which and how many CPE have the given classification). For example, one pattern of interest may be watching a particular program every Wednesday night; this type of pattern of interest may be determined from the metadata regarding primary content and user activity at the CPE 106. If the data collected indicates that a predetermined threshold of CPEs (such as e.g., CPE 106) are tuning to that same program every Wednesday, watching the program may then be considered an audience qualifier. The enrichment portion 224b of the mediation entity 224 may then classify the audience qualifier by e.g., age, in order to determine for example that the vast majority of people watching the program every Wednesday night are within the 18-25 year old age range.

Once audience qualifiers have been created and characterized, a service such as the Subscriber Information Service (SIS) 225 described by the Society of Cable Telecommunications Engineers in SCTE 130-1 and SCTE 130-6 Digital Program Insertion—Advertising Systems Interfaces standards referenced above (see inter alia, Part 6), may be used to distribute the audience qualifiers to other entities such as the ADM 226, advertisement decision service (ADS) 230.

The enrichment portion 224b of the mediation entity 224 may be further adapted to "enrich" collected audience data by the insertion of associated data elements. In other words, processing is performed and/or additional data is added so as to enhance or increase the value of the data to one or more user or downstream entities. For instance, in one embodiment, event information is coupled to user specific information, thus the enrichment portion 224b correlates the CPE's 106 native MAC address to the data. Such data can include information regarding a CPE's 106 particular configuration including, inter alia, the specific services a CPE 106 is associated with, what a CPE 106 is authorized to tune to, etc. Alternatively, enrichment may take the form of pre-processing of data or converting it to a desired format or form. For instance, "fuzzy logic" variables (e.g., "high", "medium", "low") can be converted to a linear or other reference context (e.g., "10-7.5", "7.4-3.5", and "3.4-0", respectively), or vice-versa. As another example, search terms or primitives can be generated or converted from other data, so as to be more useful in a search engine. Myriad other types of "enrichment" will be recognized by those of ordinary skill given the present disclosure, the foregoing being merely illustrative of the broader principles.

The audience qualifiers and other data are then optionally anonymized at the anonymization portion 224c of the mediation entity 224. Data may be anonymized by inter alia, the use of a cryptographic hash. In one embodiment, the techniques for providing anonymity utilizing a cryptographic hash described in U.S. patent application Ser. No. 11/186,452 filed Jul. 20, 2005 and entitled "Method and Apparatus for Boundary-Based Network Operation", which is incorporated herein by reference in its entirety, may be utilized in conjunction with the present invention. As disclosed therein, the identity of a CPE is anonymized by using a cryptographic hash coupled with an optional "opaque" variable which carries information relating to the CPE of the hash with which it is associated. The hash and opaque variable frustrate de-encryption or reverse-engineering of the individual subscriber's identity or specific location. Alternative methods of providing anonymization may also be utilized consistent with the present invention.

As illustrated in FIG. 2, the anonymized data is then passed to at least one of a plurality of data warehouses 232, 236, 238. The data warehouses 232, 236, 238 are adapted to store data and retrieve stored data for requesting entities. The data warehouses 232, 236, 238 may, in one embodiment, be adapted to utilize one or more computer applications to perform Nielsen-like analysis, and report results to requesting entities (not shown). In another embodiment, the warehouses 232, 236, 238 are in communication with one or more raw storage entities (not shown). At the raw storage, raw records (i.e., unanalyzed data) are maintained for a pre-set period of time. In one example, the raw storage entities may be adapted to maintain raw records for 12 months in a "rolling" fashion, such that once data has aged 12 months it is dropped from the storage and newer data takes its place. Exemplary raw storage entities may comprise a hybrid of storage area network (SAN), virtual tape library (VTL) and offline tape storage, or RAID array; however, other configurations having alternate components may be used as well.

In another embodiment, each of the headend collection entities 222 may comprise an individual mini-warehouse (not shown) for storage or analysis of "local" audience research data; e.g., that pertinent to the subscriber base associated with that entity 222. According to this embodiment, after a certain period of time, at a particular time of the day, or upon warehouse 232, 236, 238 request, data in the mini-warehouse will be sent to one of the "global" warehouses 232, 236, 238, thus reducing traffic to and from the warehouse 232, 236, 238. The data warehouses 232, 236, 238 to which the anonymized data may be sent is in communication with an audience qualification subsystem 234.

The audience qualification subsystem 234 takes the entire population of STBs and applies audience qualifiers which describe arbitrary PIs, or in some cases PIs which are known to be important to a particular advertiser(s). A pool of actual viewers associated with the PI can then be determined and marketed to advertisers. The audience qualification subsystem 234 rather than utilizing real-time advertisement insertion, enables "mining" of the data warehouse to find appropriate audience qualifiers. In other words, the audience qualification subsystem 234 enables an operator to know that a particular PI (and the audience qualifiers that describe it) has a meaningful population among a group of CPE. This information may then be used to build an advertising campaign.

The data warehouses 232, 236, 238 may further be in communication with a status entity 222 adapted to utilize the anonymized data to extract information regarding the status of the secondary content (i.e., time of day, frequency, etc. with which an advertisement has been inserted into primary content) and a billing entity 240 adapted to generate a bill for the insertion of the advertisement based on the determined status, the bill then being delivered to an entity associated with the advertisements. In one embodiment this occurs as described in co-owned U.S. patent application Ser. No. 12/503,772 entitled "METHODS AND APPARATUS FOR CLASSIFYING AN AUDIENCE IN A CONTENT-BASED NETWORK" filed on Jul. 15, 2009, issued as U.S. Pat. No. 8,935,721 on Jan. 13, 2015, and incorporated herein by reference in its entirety.

In one embodiment, a profile is used to describe a portion of an audience which may be translated to a series of audience qualifiers (e.g., "young wealthy mothers"). Salespersons are able to sell advertisements against profiles, for example, the salesperson may assert to a Ford dealer that its new product targeted to young women may be directly advertised to 200,000"young wealthy mothers" in Charlotte. The profile translates to a specific set of audience qualifiers which are then used to identify placement opportunities.

Each CPE for which a particular placement opportunity is valid is then, in real-time, connected to the ADM 226. The ADM 226 uses information regarding what each CPE is tuned to in order to determine which CPE are viewing a channel when an insertion opportunity occurs on that channel. The ADM 226 may then "average" the audience qualifiers associated with each CPE (provided by the SIS 225) in order to determine a "best fit" profile from among all of the profiles. The list of AQs associated with the "best fit" profile are used in a query to the ADS to get an advertisement.

If a salesperson has sold more than one advertiser on the same profile, the advertisements may be weighted so as to correlate with the "best fit" profile. In one embodiment, when the ADS gets a request for an advertisement against the AQs associated with the profile, the ADS must decide from among all of the advertisers who purchased in the profile. In a further embodiment, each sale will have a "flight window" indicating the time it should be viewed, an "audience guarantee" indicating the number of viewers meeting the profile that will view the advertisement and/or a "potential for revenue". These factors may be used in determining which advertiser will be apportioned the spot. One or more of these factors may be weighted as necessary to arrive at a "best fit" solution.

Further, the data warehouses 232, 236, 238 may share anonymized or otherwise pre-processed version of the audience data, and/or the raw analyzed data itself, with other requesting entities (such as those entities which in the past have relied on Nielsen rating data). The aforementioned communication may be transport agnostic and may utilize for example web services, SOAP/XML/HTTP/TCPIP communications. The message format may be an XML structure.

The POIS, which is in communication with the ADM, may be utilized to identify placement opportunities. The POIS is an interface which, when implemented, provides the ability for describing a placement opportunity. Identifying or triggering a placement opportunity may be session setup based (i.e., based on user events), or may be signaled with OOB communication techniques such as SCTE 35, DVB-SAD, and/or DSM-CC. A signal may be used to mark a point in the stream (or in the user-initiated case, an event). The POIS supplies "policy" information surrounding what the opportunity looks like (30 seconds and 60 seconds) and, inter alia, ownership information. The ADM is then able to detect the events and apply the policy offered from the POIS, and obtain a decision from the ADS.

The order entry 244 and status module 242 provide a real-time ability to track effectiveness of a campaign. Tracking may include utilizing information regarding the anticipated audience (e.g., what a salesperson determined the audience to be). As the ADM 226 works with the SIS 225 to play the spots necessary to fill the order information is collected (via the mediation layer). Over a given period of time, a salesperson can examine the status of the campaign and determine how close the actual audience was to the anticipated audience. In other words, the status module 244 enables mining of the data warehouse to find audience qualifiers which are useful.

The audience qualification subsystem 234 is able to apply audience qualifiers across a population to generate arbitrary patterns of interest having a meaningful population and in which an advertiser may be interested.

Audience Qualifier Classification—

As discussed previously, one aspect of the present invention regards generation of a series of common characteristics among an audience, i.e., audience qualifiers, which are then classified for future use. Based at least in part on the audience qualifiers, individual ones of the plurality of secondary content stored at the secondary content store 228 may be selected to be transmitted to the audience as described in greater detail subsequently herein.

Figure 3:
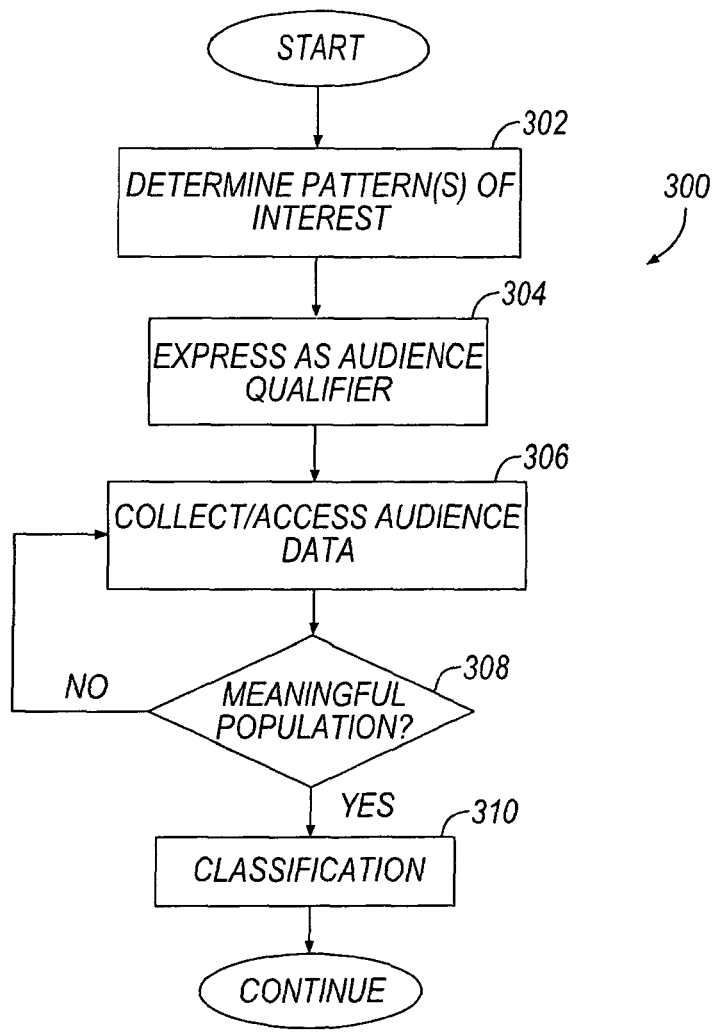
FIG. 3 is a flow diagram illustrating an exemplary method of generation and classification of audience qualifiers according to the invention.

In one embodiment, audience qualifiers are generated and classified according to the method 300 illustrated in FIG. 3. As illustrated, per step 302, one or more patterns of interest (PI) are first determined. The PI are audience characteristics which are chosen by an operator of the system as being useful or potentially useful in e.g., selecting subsequent content to provide to the CPE 106. For example, a particular retailer may be interested in the CPE 106 tuning to a particular program, selecting a particular VoD or PPV content element for delivery, or searching the Internet for particular content, thus this event may be considered a "pattern of interest". At step 304, the PIs are expressed as audience qualifiers. It is appreciated that the PI (and audience qualifiers) may be arbitrarily chosen, or chosen based on predetermined factors or features. The PI and audience qualifiers are Boolean expressions for characterizing data.

Next, at step 306, data is collected regarding an audience. In one variant, the data may be collected by a headend collector 222 from each of a plurality of CPE 106 in communication therewith. The data collected may comprise for example a size of an audience of a particular program. The data may further comprise information regarding tuning events at individual CPE 106. For example, the headend collector 222 may collect information indicative that a particular CPE 106 tuned to a program on Channel X from 8:52 pm-9:03 pm, or ordered on-demand or PPV content, etc. The data may further comprise manipulation or trick mode usage events; e.g., that the user fast-forwarded, rewound, paused, etc. the program over a given interval. For instance, LSCP (lightweight stream control protocol) or other commands sent to the headend by a particular MAC address may be recorded. Still further, data may be collected regarding the capabilities of each of the CPE 106, such as, e.g., whether the CPE 106 have DVR capabilities, whether the CPE 106 is capable of retrieving data via internet protocol (IP), etc.

Data may also be obtained passively regarding the audience at a given time. For instance, one embodiment of the method 300 of FIG. 3 determined which CPE 106 are currently active on the network (such as via a "heartbeat" indication from hardware or software on the CPE, tuning activity every so often, etc.), and via the device MAC address or hashed variable, which particular subscriber account is associated with that CPE. Stored data (such as user demographic/psychographic data obtained at time of sign-up, or gleaned from subscriber behavior over time) can then be accessed and utilized as a basis of qualification. For example, a given subscriber with a CPE having a certain MAC address may have indicated in their subscriber profile that they are age 40, make $100,000 per year, live in zip code 92127, have a family of four, enjoy golf, etc. This stored data can be accessed and analyzed in light of many other CPE active on the network at that same point to identify commonalities or patterns.

Alternatively, in another variant, a software process resident on each CPE (or selected subsets thereof) can monitor and collect data such as that described above, and package it for transmission to a headend process (e.g., software application running on a headend server or other apparatus). For instance, a distributed application (DA) having client and server portions may be used (see, e.g., FIG. 2b), wherein the client portion collects and assembles required data, and transmits the data in a file or other data structure periodically, or when requested by the server portion.

At step 308, it is determined whether the pattern of interest (and associated audience qualifier) have a "meaningful population" In other words it is determined whether the number of CPE meeting the criteria of the PI (and/or audience qualifier) satisfies a predetermined threshold. In one embodiment, a population is deemed meaningful if a predetermined number or percentage of CPE 106 share the characteristic. Accordingly, at step 308, an entity (such as the enrichment portion 224b of the mediation entity 224) may compare the number of CPE 106 reporting the characteristic. By way of example, suppose an operator determines that tuning to a particular program at a particular time (or within a time range) is to be a pattern of interest. Then, as data is collected regarding CPE 106 which have tuned (or are likely to tune) to the particular program (at step 306), a running total of the number of CPE 106 tuning thereto is maintained. When the number or percentage of CPE 106 tuning to the program exceeds the predetermined threshold, there is a meaningful population within the given definition. Up until the threshold is met, data continues to be collected. In other words the method repeats at step 306; if a population is not large enough to meet the threshold, data collection will continue until enough CPE 106 share the pattern of interest to continue the method 300.

It will be recognized that the analysis of step 308 may be based on historical data (e.g., stored in the database referenced above), that obtained in real-time or contemporaneous with the analysis, or both. For example, one embodiment of the invention uses entirely past or historical data, and determines which of the data to access and use for the population analysis based on which CPE are currently active on the network (e.g., CPE with MAC address "X" has in the past frequently exhibited the pattern of interest, and that CPE is currently active). Alternatively, contemporaneous or real-time data can be added or used solely, such as where a given CPE has just requested a tune to frequency/modulation mode/program number "Y" (corresponding to a given program channel for example), and that tune request is a pattern of interest.

In one embodiment, after a predetermined amount of time has elapsed or data has been collected, the operator may be notified that the pattern of interest is not shared by a sufficient number of CPE 106. In response the operator may either adjust the threshold number/percentage of CPE 106 required to become a meaningful population and/or, may begin again at step 302 and select a different pattern of interest. Moreover, the method of FIG. 3 can be run on different patterns of interest in parallel; e.g., by one or more threads or processes running within the analytical software.

Once a population is determined, at step 310, the population is classified. In one embodiment, the population is classified according to psychographic variables, demographic makeup, behavioral variables, and/or other characteristics such as Claritas PRIZM code, or other market segmenting service code, etc. Exemplary psychographic variables may include, inter alia, preferred genres and actors, interests and hobbies, preferences, as well as other attributes relating to personality, values, attitudes, or lifestyles. Demographic information regards for example race, age, citizenship, income, disabilities, mobility (e.g., length of commute, number of vehicles, etc.), education level, home ownership, employment status, use of services (e.g., wireless or cellular, satellite versus cable, VoIP, etc.), and geographic location.

Behavioral variables regard the type, rate or loyalty with which a person does something (e.g., always/sometimes/never watches a particular program, etc.). For instance, one behavioral classification may relate to consistency; i.e., irrespective of what action is being considered, a given subscriber is extremely consistent (e.g., consistently watches same programs at the same times every week, etc.), which can then be sub-classified if desired (e.g., always watches American Idol at the same time each week). Hence, an advertisement for a program entitled "The Making of American Idol—Behind the Scenes" may have significant penetration with an audience qualified and classified as "consistent" and sub-classified as "consistently watches American Idol".

Yet other variables and types of variables may be used in the classification process of FIG. 3 as well. For instance, predictive or statistical variables (e.g., the probability that someone will take a certain action at present or sometime in the future, and when) may be used. The classified population may then be utilized as is discussed in previously referenced U.S. patent application Ser. No. 12/503,749 entitled "METHODS AND APPARATUS FOR EVALUATING AN AUDIENCE IN A CONTENT DISTRIBUTION NET- WORK" filed on Jul. 15, 2009, issued as U.S. Pat. No. 8,935,721 on Jan. 13, 2015, and incorporated herein by reference in its entirety.

Profile Descriptive Data Files—

In many instances, a given audience may have multiple audience qualifiers associated therewith. In that event, it may be necessary to discriminate between (or use multiple ones of) the audience qualifiers to allow an addressable selection to be better narrowed to match particular advertising content or vice versa. This is accomplished, in one embodiment, by providing each advertising content element (which may be for example an advertisement or promotion, or a portion thereof) with a descriptive data file. The descriptive data file may give the genre, product type, etc. associated with the advertisement.

Figure 4:
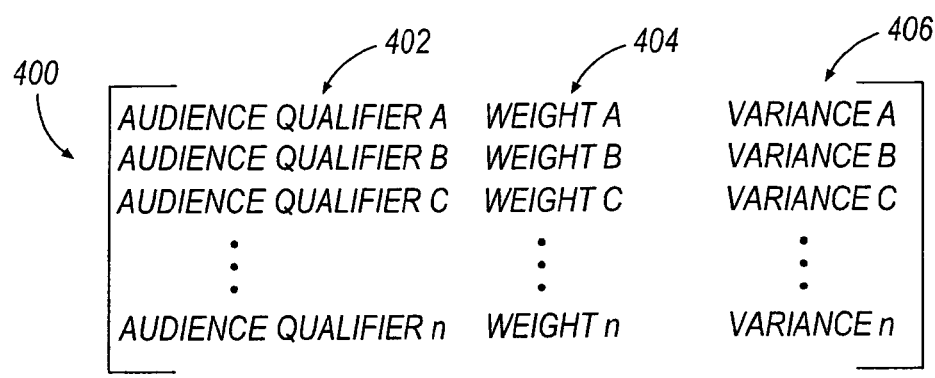
FIG. 4 is a graphical representation illustrating one embodiment of a descriptive data file according to the invention.

Further, a given profile may also be described such as in the profile descriptive data file 400 of FIG. 4. As noted previously a profile translates to a logical expression with a number of discrete audience qualifiers. The more audience qualifiers that are used, the fewer placement opportunities will be found which match the profile. Accordingly a weight and variance may be utilized with each AQ in the profile. Weighting and variance may also or alternatively be based on how often the profile has been selected historically, how many campaigns were sold against that profile, how flexible the advertisers behind the campaigns are, and the flight windows for those campaigns. The weight and/or variance may be dynamically changed. In this way, the complex profile may, over time, become more likely to be the "best fit" profile despite its complexity.

As shown, the exemplary profile data file 400 comprises a first data column for entry of a number, n, of audience qualifiers 402 (i.e., audience attribute a, audience attribute b, audience attribute c . . . audience attribute n). A weight value associated with each of the audience attributes (weight a, weight b, weight c . . . weight n) is listed in a second data column 404, and the variance associated with each weight (variance a, variance b, variance c . . . variance n) listed in a third data column 406. However, it will be appreciated that more and/or different columns may be utilized to accommodate additional information regarding the audience qualifiers, and that the columns and rows may be in different order, or even transposed. It will further be appreciated that a single audience qualifier may be associated with more than one data file, the individual data files each being representative of a single audience attribute type, or for a set of audience attributes. For instance, a given audience qualifier may include several different target demographics, and hence may be described in different ways depending on which of the several target demographics is to be addressed.

The weight illustrated in the second data column 404 of the exemplary data file 400 is a measure of the relative importance of one qualifier over another when matching an audience to the content. In one embodiment, the descriptive file 400 has default values giving each audience qualifier the same (non-zero) weight; however, other default parameters may be used including, e.g., setting default values to zero (0), setting default weights according to a randomized pattern, etc.

Moreover, the audience qualifier 402 may be arranged within the data structure 400 of FIG. 4 according to a prescribed scheme or protocol; e.g., least significant to most significant or vice versa, or least easily determined to most easily determined, and weights assigned accordingly (e.g., lowest to highest or vice versa).

For a single profile descriptive data file 400, the sum of the weights (as shown in the second data column 404) for all of the audience qualifiers (as shown in the first data column 402) equals one (1). Thus, a weight of zero (0) indicates that the particular audience qualifier should be ignored (i.e., has no bearing on the profile). A weight of one (1) indicates that the particular audience qualifier should be the only audience qualifier considered. Variance, in one embodiment, is expressed as a percentage, and provides a value for an allowance or "error band" to the audience qualifier. In other words, the variance (as shown in the third data column 406) provides a "soft" range outside the audience qualifier primary target value to allow for potentially improved "reach" of an advertisement.

Accordingly, a user (e.g., advertiser, MSO, etc.) may adjust the variance for particular audience qualifier in order to provide fine-tuning of the number and types of audience matches for a particular advertisement. In one embodiment, this may be useful in monitoring and maintaining an advertiser's advertising campaign, such as for example that discussed in co-owned U.S. patent application Ser. No. 12/503,772 filed on Jul. 15, 2009 and entitled "METHODS AND APPARATUS FOR CLASSIFYING AN AUDIENCE IN A CONTENT-BASED NETWORK", issued as U.S. Pat. No. 8,935,721 on Jan. 13, 2015, which is previously incorporated by reference herein in its entirety.

Figure 4A:
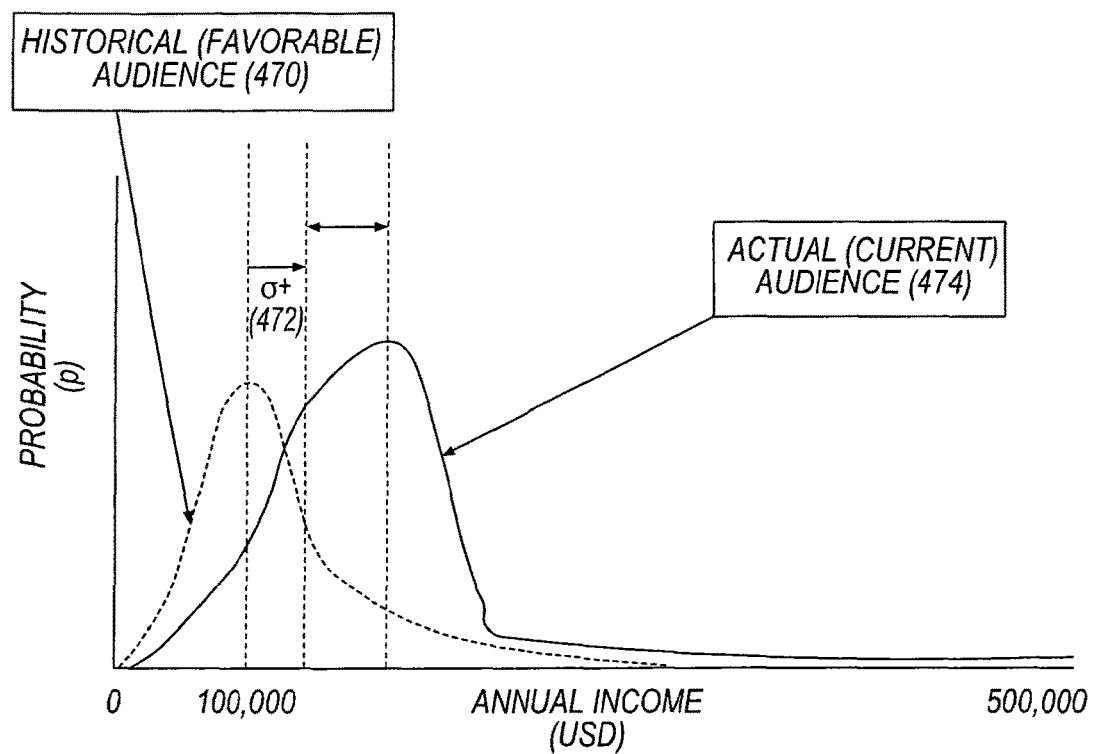
FIG. 4a is a graph illustrating exemplary statistical distributions for an attribute (e.g., subscriber income) according to the invention.

It will also be recognized that while a "variance" (e.g., error band) of the type previously described is used in the embodiment of FIG. 4, other values or types of parameters may be used in place (or in addition to) the variance and/or the weight. For example, a true statistical variance (i.e., $\sigma^2$) or standard deviation ($\sigma$), statistical mean or median, or probability (p) may be used, such as that based on actual data relating to the advertisement. For instance, a given viewing audience or population of viewers (such a previous runs of the advertisement on the network, or to a focus group) which responded positively to the advertisement may be calculated to have a given annual income probability distribution 470 as shown in FIG. 4a. The standard deviation ($\sigma$) 472 of this distribution 470 may be a given value X, which can be used to characterize the sensitivity or roll-off (or "confidence") of the audience or other population with respect to that attribute. This data may also act as the basis for more sophisticated analysis or selection functions (including those based on statistical analysis as opposed to a "go/no-go" type).

For instance, in the foregoing example, an existing (current) audience associated with a placement opportunity may have an income distribution given by a first probability distribution 474 (as determined for example by pre-stored demographic data from their subscriber accounts), whereas those who historically reacted favorably to a given advertisement have an income distribution given by a second probability distribution 470 (included as part of the data structure 400). A simple metric of comparison might comprise comparing (i) the income associated with the probability peak ($100,000 in the second distribution of FIG. 4a; here assumed to be equal to the statistical mean), and (ii) the standard deviation, for the first and second distributions. Where the values match or are similar, a high correlation (effectiveness) would be indicated, and lower correlation the more divergent the two distributions were. For example, if the peak or mean of the first distribution (current audience) is within one $\sigma$ of the peak or mean of the second distribution (historical audience who reacted favorably), then use of the advertisement on the current audience may be acceptable. Other such criteria will be readily apparent to those of ordinary skill given the present disclosure.

Such analysis can also be multi-faceted; e.g., for each different attribute. Moreover, probabilities or statistics associated with a given event or metric can be provided; e.g., a given advertisement has a probability of Y of generating an amount A of penetration into a desired demographic Q, a probability of Z of generating an amount B of penetration into the desired demographic Q, and so forth (e.g., penetration curves or even multi-dimensional surfaces).

It is also noted that the statistical distribution of audience members may also vary significantly, depending on the audience constituency and number of subscribers considered. Generally speaking, as the audience being considered gets smaller, the statistics begin to "break down" (i.e., are affected more by variations of individuals), and hence may readily deviate from a standard "normal" or Gaussian distribution (bell curve), as is well understood by those of the mathematical arts. In the limiting case of one subscriber (discussed below in the context of e.g., VoD), the statistics will be governed entirely by that sole subscriber, and hence may be skewed substantially from the larger subscriber pool (or population in general).

Figure 4B:
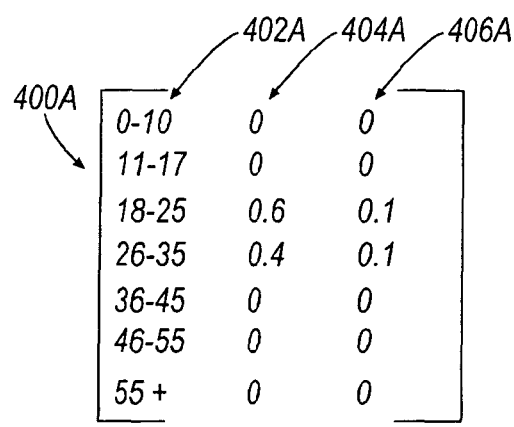
FIG. 4b is a graphical representation illustrating another embodiment of a descriptive data file according to the invention.
Figure 4C:
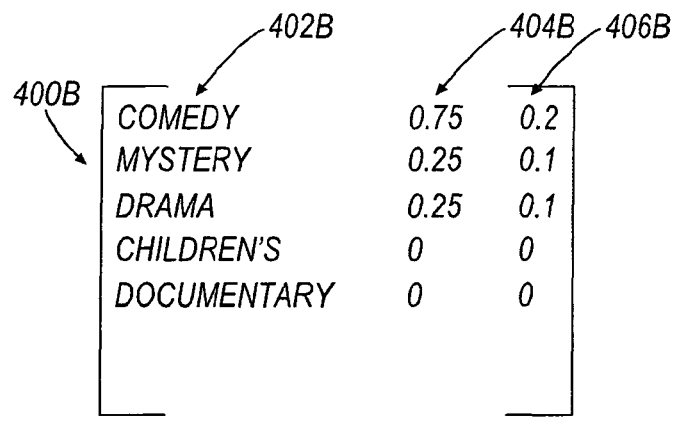
FIG. 4c is a graphical representation illustrating yet another embodiment of a descriptive data file according to the invention.

Referring now to FIG. 4b, one embodiment of a descriptive data file 400a is illustrated. The first column 402a of the exemplary data file 400a gives the audience qualifiers associated with age. For example, the first entry is the audience qualifier for ages 0-10, and so forth. As shown, the audience qualifier for ages 18 to 25 has been assigned in the exemplary data file 400a as having a weight of 0.60 (given in the second data column 404a) with a variance of 10% (given in the third data column 406a). The audience qualifier for ages 26-35 in the exemplary data file 400a is assigned a weight of 0.40 and a variance of 10%. Each of the remaining audience qualifiers has a weight of zero (0) indicating that these audience qualifiers will not be considered in finding an audience for the profile. Therefore, using the exemplary weights and variances given in the data file 400a of FIG. 4b, the audience qualifier for ages 18-25 in actuality has an effective range spanning ages 16.2 to 27.5. In other words, the 10% variance above and below the 18-25 range produces a "soft" hit range of ages 19.8 to 27.5 and 16.2 to 22.5; which is combined with the "hard" hit range of 18 to 25 to produce and effective range of 16.2 to 27.5. Using the same logic, the audience qualifier for ages 26-35 in actuality has an effective range spanning ages 23.4 to 38.5. This, when combined with the weight of each (effective) age range produces a target audience of the profile which is broader than the audience qualifiers themselves, and which may be adjusted (e.g., by adjustment of the variance and/or weight). I It is further appreciated that in some instances (such as for example the audience qualifier may not lend itself to a variance given by a percentage of the audience qualifier itself as disclosed in the exemplary embodiment above), the variance or similar parameters can be based on weight rather than the parameter itself. For example, the audience qualifier for psychographic behaviors, geographic location, and/or market segment code may not be given as numerical values, thus a variance percentage thereof may be incalculable or not determined (e.g., one can readily calculate a variance from a prescribed age or annual income band, but not so for a psychographic attribute such as "likes comedies"). In such instances, the variation may be taken as a percentage of the weight given an individual audience qualifier rather than of the audience qualifier itself. FIG. 4c illustrates an exemplary data file 400b having a non-numeric audience attribute (the psychographic behavior of a genre of content). The weight assigned to the indicator for a "preference for comedy" is given as 0.75, with a variance of 0.2. According to this model, the weight would vary by 20% in either direction.

Thus, the weight assigned to the indicator for a preference for comedy would in effect be between 0.6 to 0.9. In other words, the weight given to this preference would be varied from a weight of 0.6 to a weight of 0.9 during calculation of the "quality" of the match between a given advertisement and a given audience.

Moreover, the aforementioned non-numerical attributes can be: (i) represented as fuzzy logic variables; and/or (ii) de-fuzzified, where applicable. For example, "preference for comedy" can be represented as "high/medium/low preference for comedy", and converted to a numerical value if desired. Then, variance can be applied as previously described (i.e., to the attribute itself, whether fuzzy or not, versus being applied to the weight). Or, "preference for comedy" might be given a value of "1", whereas no preference (or preference against comedy) might be given a value of "0". Myriad other encoding schemes will be appreciated by those of ordinary skill when given the present disclosure.

Secondary Content Selection and Insertion—

In one model, as subscribers interact with various content delivery platforms via a CPE 106, secondary content insertion opportunities are triggered which causes the ADM 226 (FIG. 2a) to make placement requests to the ADS 230 for fulfillment of the insertion opportunity. The delivery platforms within which secondary content may be inserted may include, inter alia, linear television, on-demand or PPV content, pausing interactive television, web or Internet content, electronic or interactive program guides, etc. It is appreciated that for insertion of secondary content into linear broadcast insertion opportunities and on-demand bookend insertion opportunities, the well known DVS 629 and SCTE 130 standards, and SCTE 35 and SCTE 30 relating to inband digital advertisement insertion point cues and messaging to an advertising server, respectively (the foregoing each incorporated herein by reference in its entirety) may be utilized, as may yet other techniques.

The ADM 226 may have also obtained data regarding audience qualifiers from the SIS 225 and, upon an event conformant with an opportunity for insertion, the aforementioned placement request may be "enriched" with the audience qualifiers (i.e., data representing the audience cross-section for that event and insertion opportunity; see e.g., co-owned U.S. patent application Ser. No. 12/503,749 entitled "METHODS AND APPARATUS FOR EVALUATING AN AUDIENCE IN A CONTENT-BASED NETWORK", , issued as U.S. Pat. No. 9,178,634 on Nov. 3, 2015, which is incorporated herein by reference in its entirety, for one exemplary enrichment scheme) and sent to the ADS 230 for the purposes of addressability. This method should hold true for an arbitrarily large ($\infty$) or small (1) audience. Therefore, in one embodiment, the ADM, from the audience cross-section associated with the delivery platform presently under consideration for fulfilling the opportunity (e.g., VoD, etc.), determines the "proximity" a given audience is to a set of characteristics of a target audience of secondary content and, potentially, send the "optimal" set of characteristics to the ADS 230 in the form of descriptive data files 400 discussed above. The ADS 230, in turn, uses this set of descriptive data files 400 for the plurality of available advertisements to determine the optimal or best advertisement for filling the insertion opportunity.

Figure 5:
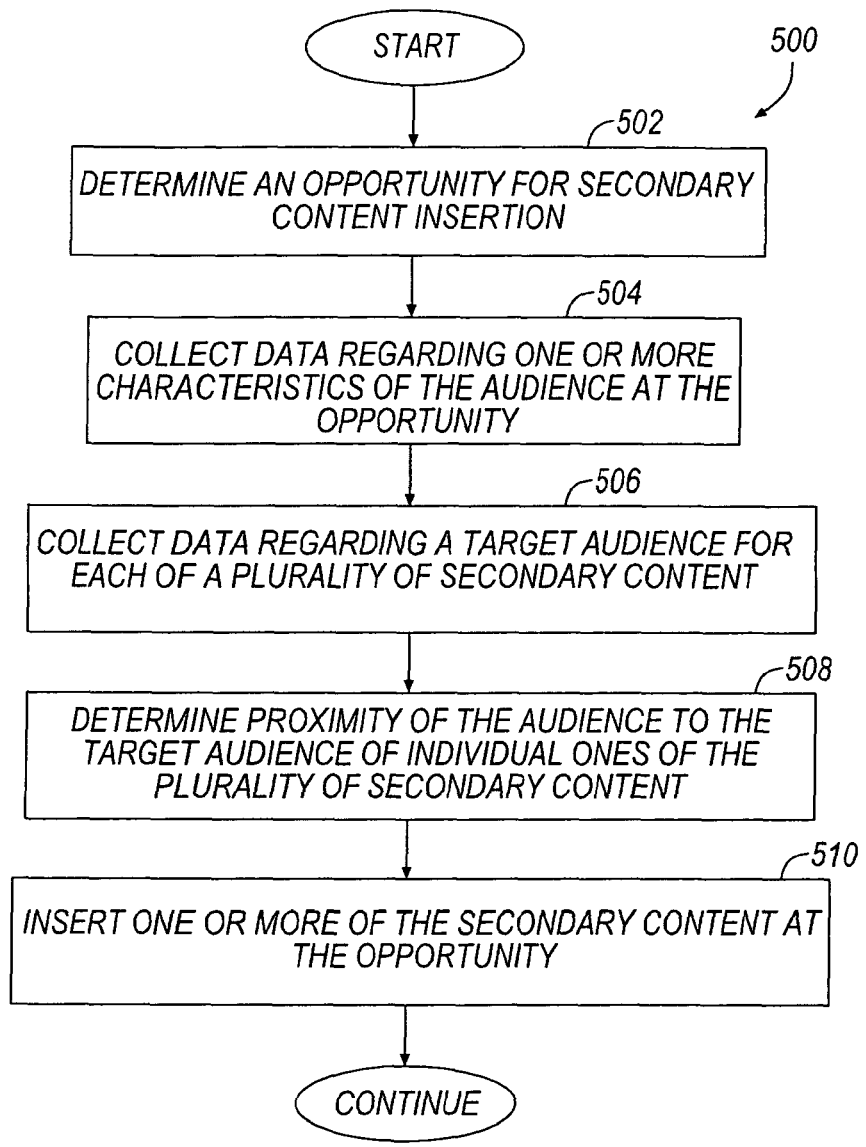
FIG. 5 is a flow diagram illustrating an exemplary method of filling placement opportunities according to the invention.

An exemplary method 500 of targeted secondary content insertion according to the present invention is illustrated FIG. 5. It is noted that in the exemplary embodiment, the ADM 226 (either through a real-time dialog with a SIS 225 or through one-time requests as the ADM 226 becomes aware of CPE 106 attached to it) develops and dynamically maintains a list of each CPE 106 of which it is aware.

As illustrated, per step 502, an opportunity for insertion of secondary content is identified. In one embodiment, the opportunities can be determined well in advance of the scheduled broadcast presentation of the primary content. For example, particular primary content may be sent to an MSO from a content source (e.g., network or the like) along with a data file or metadata indicating a predetermined number of secondary content insertion opportunities of predetermined length and location within the primary content stream.

Alternatively, the MSO itself may place secondary content insertion opportunities at locations it has determined within the primary content stream. In one embodiment, this placement may comprise utilization of an entity associated with the MSO adapted to determine the existence of one or more cues in the MPEG stream indicating insertion points. The cues may comprise for example, digital program insertion cues such as those disclosed in Society of Cable Telecommunications Engineers standard for Digital Program Insertion Cueing Message for Cable, ANSI/SCTE 35 2004, incorporated herein by reference in its entirety. However, it will be appreciated that other cueing mechanisms and/or mechanism for determining insertion opportunities may be utilized in conjunction with the present invention as well.

Furthermore, secondary content insertion opportunities may be determined effectively right up until the time of broadcast or even during broadcast thus, in some instances, insertion decisions can be made "on the fly".

Per step 504, data is collected regarding one or more characteristics of the audience ostensibly viewing the primary content at the time of the secondary content insertion opportunity. For example, audience qualifiers may be generated and classified (as discussed previously) and ultimately transmitted from the SIS 225 to the ADM 226.

In one embodiment, data regarding the characteristics of the audience or their CPE 106 may be collected at some time in advance of the audience actually viewing the stream. In other words, data may be collected regarding an audience which viewed one or more prior instances of this same primary content (or related content). For example, statistics may be generated regarding viewership of periodically broadcast content (such as e.g., weekly, daily, or seasonal programming) which is then used to predict an audience of a subsequent iteration of the same or similar programming. Thus, if it is known that for the last month women ages 18-25 watch American Idol every Tuesday between 8:00 pm and 9:00 pm; this data may be used to predict that during an secondary content insertion opportunity occurring on the channel which airs American Idol on next Tuesday, at 8:24 pm, women ages 18-25 are likely to make up a large percentage of the audience.

Alternatively, data may be collected regarding the audience just prior to the insertion opportunity. In other words, the audience may be characterized and classified (as discussed above) as the primary content is broadcast; thereby providing a more precise characterization of the actual audience that will likely view the inserted secondary content. It will be noted that audience characterization and determining content for insertion closer in time to the actual presentation of the inserted content (i.e., temporal proximity of the decision to the actual insertion point) often enables the system 220 to more accurately characterize an audience, thus providing opportunities for more directly targeted advertisement insertions. Specifically, the constitution of an audience has less chance of changing significantly when the insertion opportunity follows shortly after data on that audience is collected, since most people who were watching when the data regarding them or their activities was collected will not have tuned away, turned off their TV set, etc., and will still be watching something.

In another embodiment, rather than sending the user or CPE 106 characteristics to the ADM 226 only upon request or when an insertion decision must be made, the ADM 226 may be adapted to store information regarding the characteristics of each user and/or CPE 106 (such as by request and receipt of that information from the SIS 225 continuously or after CPE 106 activity). When an opportunity arises (e.g., a SCTE 35 message is received on a broadcast stream), the ADM 226 determines the number of users/CPE 106 for which that opportunity is valid (e.g., the audience tuned to the broadcast service on which the SCTE 35 message was received). It then processes (e.g., averages, generates a statistical distribution, generates a fuzzy logic characterization, etc.) the characteristics of the audience for all or a selected subset of the CPE 106 tuned to the broadcast in order to generate audience characteristics that are used in the placement request message to the ADS 230.

It will be appreciated that in certain cases, such as when an individual subscriber initiates a VOD session for an asset that has been configured with a "pre-roll" insertion opportunity, the foregoing average/distribution or other description can be nothing more than the set of characteristics of an individual CPE 106. However, the system 220 may also be configured to draw additional contemporaneous or historical data to "soften" the user-specific data if desired. For example, if a given user has a prescribed behavior which may not be representative of the rest of his family or friends (e.g., has very focused, narrow or unusual interests or demographics), advertisements selected solely for him may not be very applicable or useful to his family/friends. Hence, in one variant of the invention, the delivery platform (e.g., VoD) allows for the selection of "single user" or "multiple user" modes, such as via the VoD on-screen ordering menu or other user interface, whereby in multiple user mode, advertisements can be selected based on a more mainstream or broadly applicable basis (such as by pulling in data from others who have selected the same VoD content previously, etc.).

It is further noted, that in one embodiment, per the SCTE 130-1 specification previously incorporated herein by reference in its entirety, a unique identifier (e.g., MAC address or some other similar identifier) is passed between the ADM 226 and SIS 225 in order for the ADM 226 to become aware of the CPE 106 and/or for obtaining data relating to the characteristics of the CPE 106 or the associated subscriber. In one embodiment, the privacy of the users associated with each CPE 106 is maintained by implementing a one-way hash on the CPE 106 unique identifier, and/or by utilization of an "opt-in" system (wherein the users affirmatively agree to have data collected and transmitted as described herein). The exemplary system would further use the same one way hash on anonymized data stores from disparate systems (e.g. billing, etc.), thus allowing correlation and enrichment of tuning records while maintaining user privacy. The SIS 225, when obtaining characteristics of the CPE 106, utilizes this same hashing algorithm. Thus, when an ADM 226 sends a request for information on a particular CPE 106, the SIS 225 is able to use the common one-way hash to evaluate a hash value against database of anonymized CPE 106 and their respective characteristics and to retrieve the characteristics for the particular CPE 106 without knowing or revealing the actual subscriber associated with the CPE. It is further noted that in one variant, when a CPE 106 is no longer "attached" to the ADM 226, the ADM 226 destroys its copy of the characteristics associated with the CPE 106, thereby further protecting privacy.

In one embodiment, the techniques for providing anonymity utilizing a cryptographic hash described in U.S. patent application Ser. No. 11/186,452 filed Jul. 20, 2005 and entitled "Method and Apparatus for Boundary-Based Network Operation", previously incorporated herein by reference in its entirety, may be used to protect the user's privacy in the above described information transmission, although other techniques may be used as well consistent with the present invention.

Referring again to FIG. 5, per step 506, data is collected regarding a target audience for each of a plurality of secondary content. Data regarding a target audience may be provided from a source associated with the secondary content; or, alternatively, may be developed by the MSO utilizing information supplied by the source associated with the secondary content. As indicated previously, data regarding a target audience may comprise a series of audience attributes (characteristics which are desired of the target audience). In one embodiment, the data regarding a target audience is compiled in a descriptive data file 400 (as illustrated in FIG. 4). The descriptive data file enables a user to fine-tune the target audience of advertisements such as by making adjustments to the weight and variance for each of the audience aspects examined.

Next, at step 508, the proximity of the audience of the placement opportunity to the target audience of the secondary content is determined. In one embodiment, an algorithm (e.g., software application) running on the ADS 230 and/or the ADM 226 utilizes information about the audience obtained from the subscriber information service 225 and information about the plurality of advertisements obtained from the order entity 224 to match particular ones of advertisements to audiences at insertion opportunities. If an audience is within a predetermined threshold of similarity to the target audience of secondary content, the secondary content will be selected (at step 510) for insertion at the placement opportunity. The algorithm used to make this selection advantageously can be very simple (e.g., under current digital program insertion scheme, a simple flat file (CCMS or schedule file) will contain expected times for insertion events and the advertisements that must be placed during those events), or may be more complex, depending on the needs and desired level of performance.

Specifically, in one variant, the selection logic of the algorithm evaluates all candidate or available advertisements fitting prescribed physical parameters (e.g., runtime sufficient to fit within the available slot) and/or other screening criteria. From this evaluation of the candidates, that advertisement having the highest similarity score (proximity) to the audience characterization (based on the weights and variances of the data structures 400 of FIG. 4) is selected for insertion.

Figure 5A:
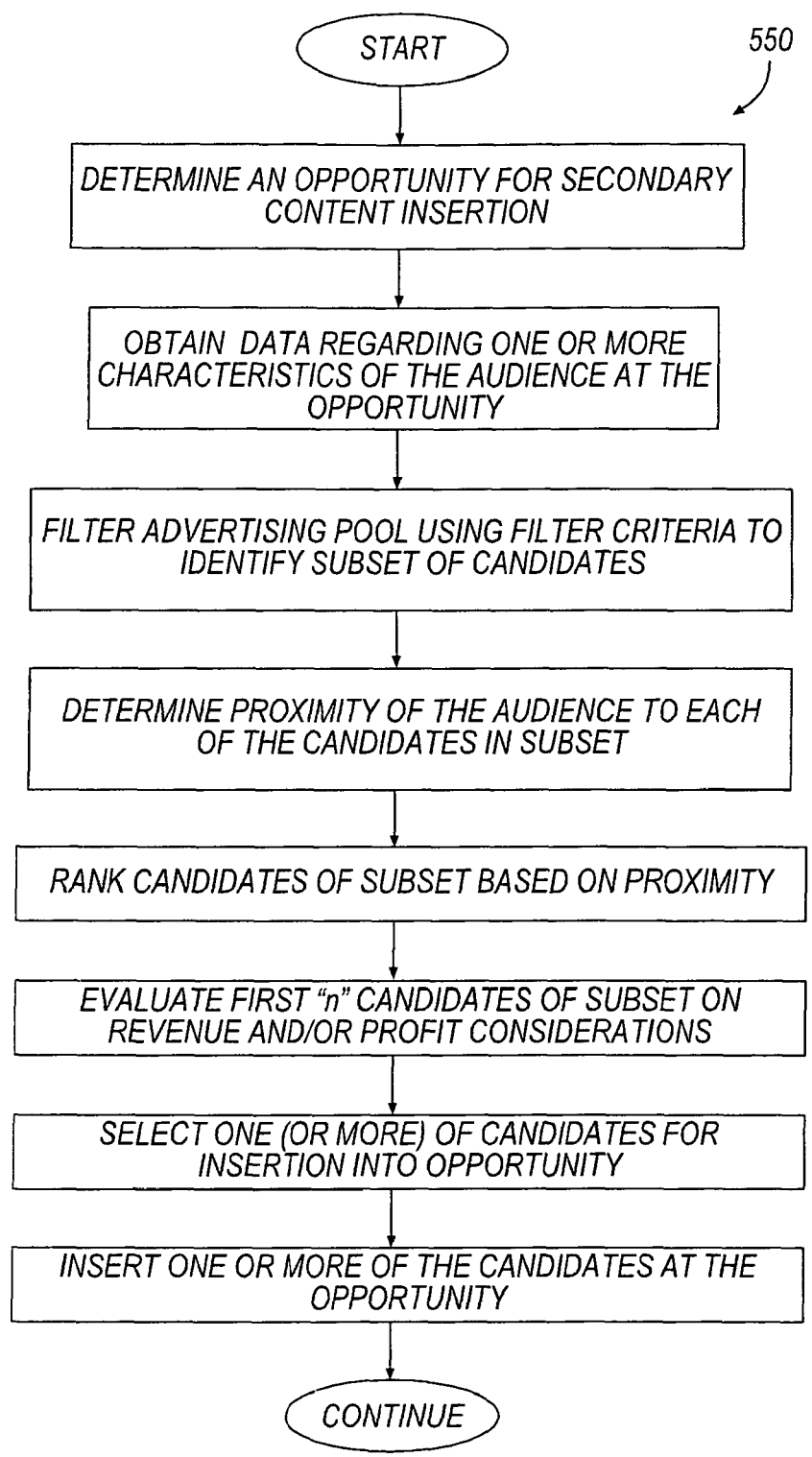
FIG. 5a is a flow diagram illustrating one implementation of the method of FIG. 5, optimized for revenue or profit.

Alternatively, other selection criteria can be employed, such as where candidate advertisements are ranked by (proximity) score, and that advertisement which meets both minimum score criteria and revenue or profit criteria is selected. For instance, one advertisement may have a higher proximity score than another, yet have a lower revenue or profit value associated with it (i.e., the advertiser is paying less than the advertiser of the lower scoring advertisement), thereby making it more profitable for the MSO to insert the lower proximity scored advertisement (see exemplary flow of the process 550 of FIG. 5*a*).

In another variant, an "impressions" threshold criterion is used as a basis of selection. For instance, a given advertiser may have goals or even a contract with the MSO for so many "impressions" of its advertisement (i.e., views by target demographics within the MSO subscriber pool). Hence, if two advertisements are of generally equal or sufficient proximity score, the algorithm may select the one which has not yet met its impressions threshold (thereby ostensibly not giving away "freebies" to advertisers whose advertisements have already had their contractual obligations met by the MSO).

In another embodiment, other factors may be utilized including for example, the frequency with which particular secondary content has been inserted over a given time period (e.g., that day), on a given physical channel, etc. Selection of secondary content for insertion may also be adjusted according to a campaign management scheme such as that discussed in U.S. patent application Ser. No. 12/503,772 filed on Jul. 15, 2009 and entitled "METHODS AND APPARATUS FOR CLASSIFYING AN AUDIENCE IN A CONTENT-BASED NETWORK", which is previously incorporated by reference herein in its entirety.

It will also be appreciated that the insertion algorithm and methods described herein may be used to place two or more secondary content elements (advertisements, promotions, etc.) into a single placement opportunity, or alternatively a single advertisement into multiple placement opportunities. As an example of the former, a given opportunity or "slot" may be 60 seconds long, and two 30-second advertisements which have acceptable or desirable proximity scores can be placed therein in succession. Moreover, the selection algorithm can be configured to identify explicitly or implicitly related advertisements/promotions for such successive placement opportunities. For instance, two advertisements may be explicitly linked by the advertiser (e.g., dealing with the same topic or product/service, but having different scenarios, actors, situations, etc.), and/or reference one another explicitly in the content of the advertisement. Implicit reference can exist for example in the case where the subject matter of the two or more advertisements has one or more points of contextual tangency (e.g., both deal with President's Day sales, but at different unrelated stores). Both explicit and implicit relationships are identified by the exemplary embodiment of algorithm of the present invention by use of metadata that is part of the advertisements. For instance, in one variant, the data structure 400 of FIG. 4 can be appended with XML or other format metadata which can be read by the algorithm (or even a human reviewer) and matched to that of other advertisements. For instance, one such variant has metadata in a prescribed format; i.e., {primary descriptor}/{secondary descriptor}/{tertiary descriptor}, where the primary descriptor is a two-digit code indicating a primary topic or aspect of the advertisement, the secondary descriptor encodes a secondary topic or aspect of the advertisement, and so forth. For example, an advertisement for the American Idol television program might have a primary code indicating genre ("reality"), a secondary code indicating singing ("vocal"), and a tertiary descriptor indicating that it is a Fox program ("Fox"). A specific reference to another advertisement (e.g., "No. 123456-2") may indicate explicitly to the selection algorithm that this encoded advertisement (No. 234789) should be paired with No. 123456, and displayed second ("-2"). The other advertisement (No. 123456) would also carry encoding indicating pairing with No. 234789 (e.g., "No. 234789-1, with "-1"

indicating that 123456 is to be run first in temporal order). Implicit matches can be found just by matching metadata codes or words.

As a simple illustrative example of the foregoing selection algorithm calculations, an opportunity for secondary content insertion may be predetermined to be within a broadcast presentation of a World War II documentary. The particular audience at that insertion opportunity is then determined. Suppose that the data collected regarding the audience is processed (at e.g., the enrichment portion 224b of the mediation entity 224) to determine that the audience generally comprises persons ages 36-45, having the Claritas PRIZM code "Country Squires". Next, data is collected regarding a plurality of available advertisements. For the sake of simplicity, suppose for example that the descriptive data files for three advertisements (advertisements 1, 2, and 3) are given as illustrated in FIG. 6. As shown, the first advertisement is primarily targeted to persons age 36-45, as that attribute (age) has a high weight (0.8) and small allowable variance. The second advertisement is primarily targeted to the Claritas PRIZM code "Country Squires" which has weight of 0.6 and larger allowable variance. The third advertisement is primarily targeted to women age 26-35, as each attribute is given a weight of 0.5, and no allowable variance. From this information, the ADS 230 will determine that advertisement 1 has the closest proximity to the audience at the placement opportunity. Specifically, although both advertisements 1 and 2 are targeted to the audience, advertisement 1 is selected because the characteristic shared with the audience (i.e., age 36-45) is given greater weight (0.8) than the characteristic of advertisement 2 which is shared with the audience (i.e., "Country Squires" having a weight of 0.6).

Figure 6A:
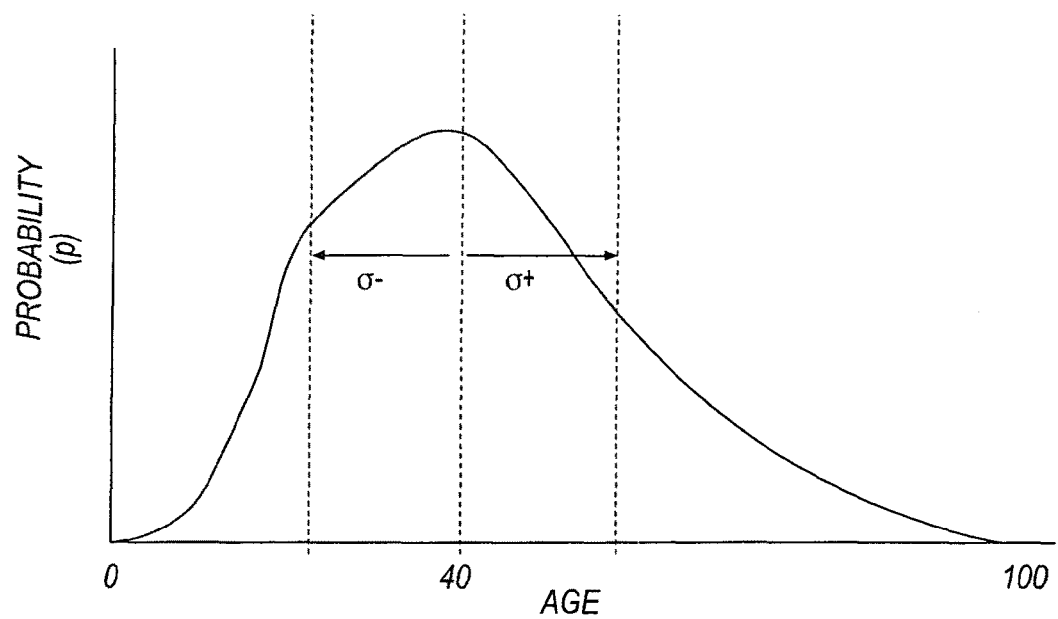
FIG. 6a is a graph illustrating an exemplary statistical distribution for an audience attribute (age).

It is further appreciated that other methods may be implemented concurrently with or in the place of the secondary content selection and insertion methods discussed above. For instance, the previously described statistical approaches may be employed, such as where the audience for the above-referenced documentary is given an age distribution as shown in FIG. 6a. "Variance" in the data structures of FIG. 6 could be replaced with a standard deviation ($\sigma$) for example, such that if the peak of the distribution of FIG. 6a for age (age 40), or another quantity such as statistical mean (average) or median (half above, half below) falls within the prescribed $\sigma$ value, then a "hit" for that attribute is present (thereby generating a score of 0.8 for advertisement 1).

In another embodiment, the individual CPE 106 (e.g., the client process shown in FIG. 2b) may "know" the audience qualifiers or characteristics which are associated with the relevant user(s) or subscriber(s). In this case, a messaging infrastructure between a headend component sends a listing of all current or existing advertisements targeted to those characteristics (i.e., having descriptive data files 400 which have a predetermined level of closeness to the characteristics) of the CPE to the CPE 106. The CPE 106 stores the listing data identifying the advertisements (or even the advertisements themselves, such as on a local DVR or other mass storage device "store") and based on the behavior of the customer on that particular device 106 at an insertion opportunity, determines which of the advertisements to insert. Actual insertion can be performed at the headend (e.g., via an upstream selection message sent to the ADS or ADM), or alternatively via the CPE 106 itself when properly equipped. In one variant, the CPE 106 publishes to the headend device (such as the ADS 230 or ADM 226) an ordered list of the "best" to "least" fitting advertisements for particular ones of insertion opportunities. This "publication" may be according to any number of different schemes including e.g., periodically, upon the occurrence of a given event (e.g., CPE startup, shutdown, etc.), or upon a request or "pull" from a network entity.

In other embodiments, the delivery of targeted content may be accomplished by directing the relevant subscribers' CPE 106 to tune to an unused transmission channel for receipt of a substitute set of advertisements, such as via the targeting advertisement methods described in co-owned U.S. patent application Ser. No. 10/639,070 filed Aug. 12, 2003, entitled "Technique for Effectively Delivering Targeted Advertisements Through a Communications Network Having Limited Bandwidth," and issued as U.S. Pat. No. 9,247,288, on Jan. 26, 2016, which is incorporated herein by reference in its entirety. In one variant, the relevant subscribers may have their CPE 106 forcibly tuned to the unused channel based on commands sent from the headend or other network location (e.g., via an immediate update to their program mapping table, via existing BSA client protocols, message from the ADS or ADM, or the like) so as to present a seamless and effortless transition to the subscriber. Alternatively, a new program stream can be instantiated (e.g., using the aforementioned BSA techniques) with the relevant advertising or promotional content spliced therein, the user's CPE 106 then being directed to tune to the newly generated program channel.

In yet another embodiment, the aforementioned secondary content selection methods may be utilized for comparison to metadata in a plurality of available advertisements in order to enable a viewer to individually preview and select the advertisements that they will view. This comparison and subsequent presentation of targeted advertisements may occur via, for example, the methods described in co-owned U.S. patent application Ser. No. 12/070,559 filed Feb. 19, 2008, entitled "Methods and Apparatus for Enhanced Advertising and Promotional Delivery in a Network", issued as U.S. Pat. No. 9,503,691 on Nov. 22, 2016, which is incorporated herein by reference in its entirety. The methods and apparatus enable a viewer to individually select and view advertisements during real-time broadcast program settings, as well as during "trick mode" operation in recorded program settings. Guess-work associated with skipping commercials via manual fast-forwarding through recorded content is eliminated, and a viewer is presented with several options regarding which advertisements to view and when to view them. In one variant, decoupling of advertising or promotions from a previously recorded program is provided, thus affording the network operator flexibility to insert various advertising content options, or selectively replace dated or expired advertisements, or those having less correlation to a current program content stream. In another variant, advertising or commercial skipping is substantially frustrated by presenting a viewer with several viewing options.

Figure 7:
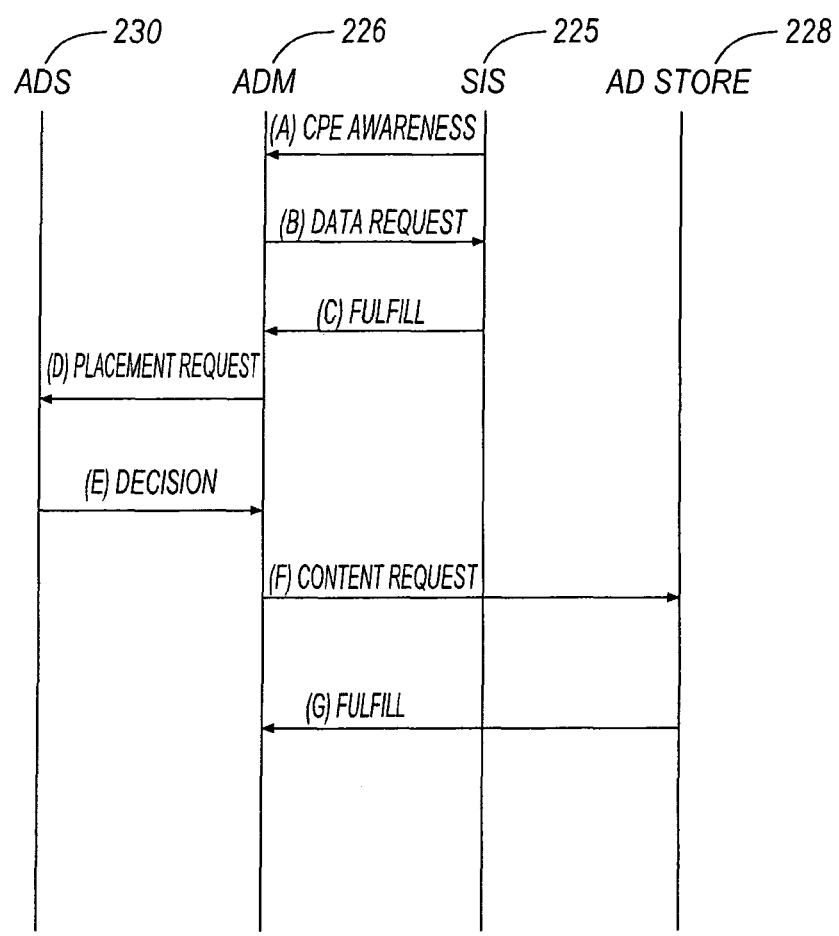

FIG. 7 is a ladder diagram illustrating one embodiment of the communications between the various entities of the audience classification and advertising management system 200 (here, in the particular context of the embodiment of FIG. 2a, including the ADS 230, ADM 226, SIS 225 and Advertising Store 228). As illustrated, at step (a), a CPE awareness message is transmitted from the SIS 225 to the ADM 226. The CPE 106 awareness messages (a) may be sent via real-time dialog between these entities, or through one-time requests. Once the ADM 226 becomes aware of CPE 106 attached to it, the ADM 226 develops and maintains a list of CPE 106 it is aware of. At step (b), the ADM 226 requests data from the SIS 225 regarding audience qualifiers and/or audience activity. The data request is then filled by the SIS 225 (at e.g., step (c)). Next, upon an event conformant with an opportunity for insertion, a placement request is sent to the ADS 230 (step d). In one embodiment, the placement request may be enriched with audience qualifiers (i.e., data representing the audience cross-section for that event and insertion opportunity) and sent to the ADS 230 for the purposes of addressability. The ADS 230 returns a decision (step e) regarding which content to insert at the placement opportunity. The ADM 226 uses information in the decision to send a content request (step f) to the Advertising Store 228, which, in turn, provides the requested content (step g).

Content Delivery Platforms—

The aforementioned primary and secondary content may be presented to a user on any one of a variety of content delivery platforms. In one embodiment, data regarding an audience of linear broadcast television may be utilized for secondary content insertion opportunities therein. In another embodiment, the secondary content may be provided in a reduced or particular section of the television screen. VOD (Free, Pay, and/or Subscription) and VODx programming may also have secondary content inserted either immediately before or immediately after the presentation thereof, or as part of an "intermission".

The methods and apparatus discussed above may further be implemented in primary content which has been stored on DVR, PVR and/or nPVR, etc. In one embodiment, the aforementioned methods and apparatus of the invention may be used to replace or substitute for secondary content within the original broadcast presentation of the recorded content with updated or targeted secondary content (e.g., replace outdated time- or context-sensitive advertisements with newer or more contextually relevant ones).

Alternatively, targeted secondary content may be inserted prior to or immediately following the recorded content (or in gaps created by other substitutions).

In still another embodiment, an entity of the headend network may determine appropriate targeted secondary content insertion opportunities within the primary content.

Figure 2B:
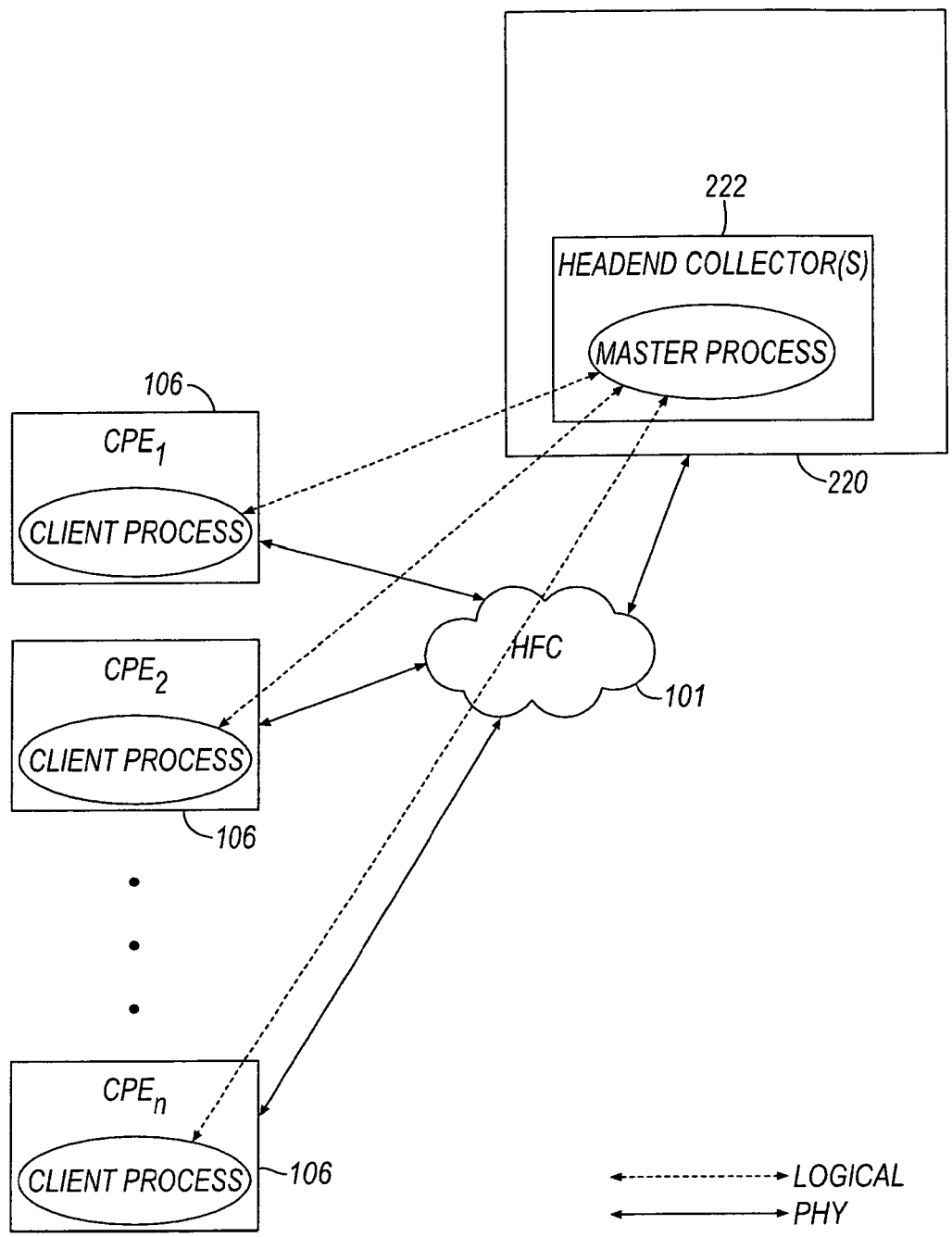
FIG. 2b is a block diagram illustrating one exemplary client/master software architecture according to the invention.

The CPE 106 or associated premises device (e.g., DVR) may also maintain an advertising content store, which can be utilized for insertion of secondary content into previously recorded primary content (whether at the direction of a local process, such as the client process of FIG. 2b, or a headend process such as part of the system of FIGS. 2-2a herein).

In another embodiment, still image advertisements (e.g., JPEG, TIFF, or other images) may be inserted into broadcast "overlays" or other display mechanisms which display data to customers in conjunction with other content.

In yet another embodiment, when customers launch the IPG (MDN or ODN) or EPG, there may be occasions where available opportunities exist for placing still image advertisements as well.

Targeted secondary content may also be inserted according to the methods discussed above into web pages, telephone user interfaces (e.g., VoIP interfaces), and/or text messages received to a CPE as well.

CPE—

Figure 8:
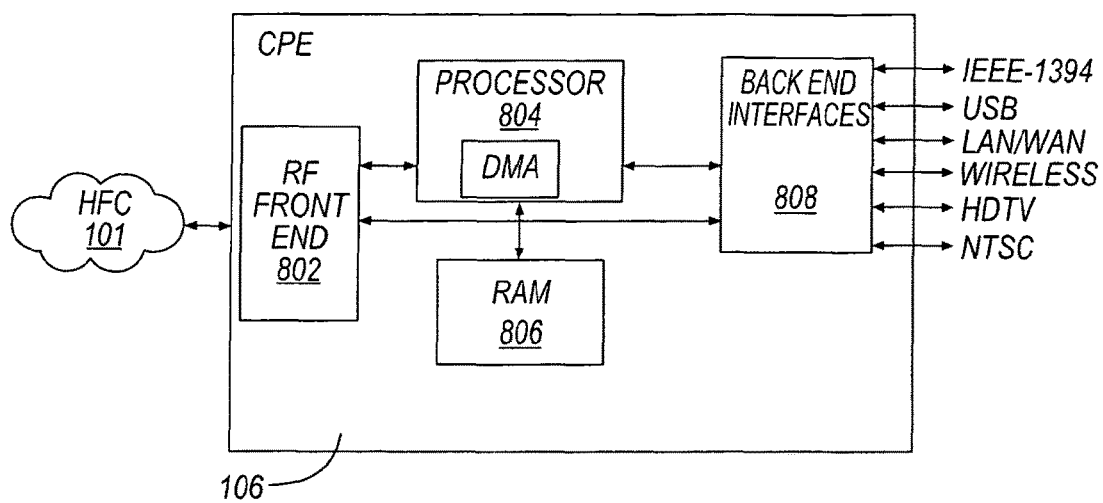
FIG. 8 is a functional block diagram illustrating an exemplary embodiment of CPE adapted to support data collection and transmission functionality.

FIG. 8 illustrates an exemplary embodiment of the improved CPE 106 according to the present invention. It will be appreciated that in MSO implementations where no CPE or client portion of the data collection software process is used, literally any type of CPE 106 that is compatible with the bearer network may be used. However, in cases where a client portion is desired (e.g., to obtain subscriber/use/CPE profile or operational data and send it back upstream to the network portion residing on e.g., the mediator, ADM or ADS of FIG. 2a), the following exemplary configuration may be used.

As shown in the simplified diagram of FIG. 8, the exemplary device 106 generally comprises and OpenCable (OCAP)-compliant embedded system having an RF front end 802 (including tuner and demodulator/decryptors) for interface with the HFC network 101 of FIGS. 1-1c, digital processor(s) 804, storage device 806, and a plurality of interfaces 808 (e.g., video/audio interfaces, IEEE-1394 "Firewire", USB, serial/parallel ports, etc.) for interface with other end-user apparatus such as televisions, personal electronics, computers, WiFi or other network hubs/routers, etc. Other components which may be utilized within the device (deleted from FIG. 8 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 8 is also provided with an OCAP 1.0-compliant application and Java-based middleware which, inter alia, manages the operation of the device and applications running thereon (including the aforementioned client software process where used). It will be recognized by those of ordinary skill that myriad different device and software architectures may be used consistent with the tuning functions of the present invention, the device of FIG. 8 being merely exemplary. For example, different middlewares (e.g., MHP, ARIB, or ACAP) may be used in place of the OCAP middleware of the illustrated embodiment.

The exemplary CPE 106 further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the data collection client process.

In another embodiment, the CPE 106 comprises a converged premises device, such as for example that described in co-owned U.S. patent application Ser. No. 11/378,129 filed Mar. 16, 2006, entitled "METHODS AND APPARATUS FOR CENTRALIZED CONTENT AND DATA DELIVERY", and issued as U.S. Pat. No. 8,347,341 on Jan. 1, 2013, incorporated herein by reference in its entirety.

As previously noted, the CPE 106 of FIG. 8 further comprises a client portion of a distributed application (see FIG. 2b) configured to collect and/or transmit data, in the form of e.g., a software application running on the CPE. This software application may be configured to perform any number of functions relating to targeted advertising or promotion delivery, including without limitation: (i) forming a cryptographic hash of one or more CPE-specific variables in order to maintain the anonymity of the CPE/subscriber with respect to historical or profile data, as previously described; (ii) generating "telescoping" advertisement interfaces or other user interfaces that allow the subscriber to interact with the CPE; (iii) collecting data on user-specific activities such as tuning or activity logs, power on/off times/duration, PPV/VoD requests, frequency of use of other ancillary functions associated with the CPE, DVR or monitor operation and use (such as via communications from a connected DVR or monitor device), etc.; (iv) identifying and communicating CPE hardware or software errors logged by the middleware; (v) identifying and communicating new hardware or software components logged with the middleware registry, (vi) maintaining an advertisement "list" such as that described previously herein; (vii) causing or performing insertion of advertising content into recorded or received content; and so forth.

As previously noted, any data of interest may be directly transmitted to the upstream software portion (e.g., via an OOB message or other communication), or stored or logged in a file and sent when requested by the system 200 (or according to other models, such as being sent periodically, on CPE startup, etc.). Moreover, the network system 200 can also receive and log events during the normal course of operations (in conjunction with any data obtained and forwarded by the CPE software client or other processes running thereon), such as e.g., upstream OD content requests, PPV requests, LSCP "trick mode" commands, EPG update requests, etc.

Business Methods and Considerations—

Various exemplary business-related aspects of present invention are now described in detail.

In one embodiment, access to the various aforementioned aspects of the audience classification system including the algorithm for determining the proximity of an advertisement to a target audience is provided as an incentive to certain advertisers (e.g., those willing to pay higher premiums for access thereto), or for consideration. For example, access to certain delivery platforms may vary depending on an advertiser's payment. Also, selection of an advertisement from among a plurality of available advertisements may be associated with the subscription or payment level of the advertisers associated with the available advertisements.

It is also noted that an MSO may utilize the ability of the present invention to insert secondary content (including targeted secondary content) into the primary content as a business model with respect to advertisers. In other words, certain advertisers may pay a higher premium to have their advertising content associated with a particular subset of viewers, or where the MSO can "guarantee" a high ratio or number of impressions by a target audience or demographic. The MSO can, using the techniques described herein, ostensibly provide such a guarantee, since they are able to pointedly characterize and affirmatively determine which of their subscribers are watching a given insertion opportunity, and what their characteristics are.

Additionally, the MSO can "package" the data (e.g., the anonymized data for privacy concerns) relating to subscriber use activities and patterns, for sale or distribution to other entities such as advertisers, networks, etc. Knowledge of the viewing or other behaviors of particular demographics is a valuable commodity which can advantageously be leveraged using the present invention.

It will also be recognized that pricing of inventory or placement opportunities can be dynamically set based on other considerations, such as for example based on proximity in time to the actual opportunity. For instance, pricing may change (increase) as the placement opportunity approaches, akin to airline ticket pricing. As another alternative, pricing may be a function of the number of advertisers interested in a given inventory item (e.g., where two or more separate advertisers are interested in a given inventory item, the item may go to the first advertising will to pay a prescribed "premium"). Other business-related aspects of the present invention may be appreciated given the foregoing disclosure. For example, inventory may also auctioned, or provisioned based on loyalty or context (e.g., navigation based, day/time based, etc.). Further, inventory may be bundled to provide part of a campaign across several different platforms and/or devices.

Operations/Business Rules Engine—

In another aspect of the invention, the aforementioned audience classification system 220 (e.g., including one or more computer programs) optionally includes an entity having an operations and/or business rules "engine". This engine comprises, in an exemplary embodiment, a series of software routines that are adapted to control the generation, analysis and transmission of audience classification data. These rules may also be fully integrated within the aforementioned one or more computer programs and be controlled via the entity on which the program is run. In effect, the rules engine comprises a supervisory entity which monitors and selectively controls the generation, analysis, and/or transmission functions at a higher level, so as to implement desired operational or business rules of the MSO or other parties of interest.

The rules engine can be considered an overlay of sorts to the algorithms of the previously described computer applications. For example, the exemplary computer application may invoke certain operational protocols or decision processes based on data received (e.g., historical activity or user data, subscriber preferences, etc.), as well as network operational or historical data, demographic data, geographic data, etc. However, these processes may not always be compatible with higher-level business or operational goals, such as maximizing profit on a network-wide basis (or after consideration of other factors not examined by the collecting entities such as advertising revenue, RTA/acquisition costs, "costs" of delivering streams based on required bandwidth, taxes, maintenance or repair costs, additional equipment leasing or use costs, etc.), or system reliability and/or flexibility. Moreover, the computer application being "supervised" may be operating on a per-CPE, per-household, or per-request basis (i.e., evaluating each individual CPE effectively in isolation, and generating an insertion decision without considering larger patterns or decisions being made in the service group or network as a whole).

Hence, when imposed, the business/operational rules of the engine can be used to dynamically (or manually) control the operation of the aforementioned processes in conjunction with the generation, analysis, and/or transmission functions previously described.

For example, one rule implemented by the rules engine may comprise selectively transmitting or analyzing data regarding viewership only from certain users; e.g., those who have agreed to have their viewership data collected. Accordingly, only those users who affirmatively "opt in" will have audience research data collected about their household or CPE 106. In another variant, insertion and/or recommendation of targeted content is provided only to users who agree to have viewership data collected.

As noted throughout, a user may elect in the present invention not to have personal identifying information or data regarding viewership collected and transmitted, and/or not to have any such data collected utilized for targeted content generation and insertion and/or recommendation. Thus, an incentive may be offered to those users who affirmatively agree to collection and transmission of audience research data and/or to targeted insertion or recommendation of content. For example, a user may be offered the targeted content free or at a reduced price (if it is purchasable content, such as VOD, Pay-per-View etc.), or may be offered other services at no charge or at a reduced price.

As another alternative rule, inventory (i.e., placement opportunities combined with a particular viewership) may only be assigned to given advertisers who meet certain reliability and/or quality standards, or who have been prequalified by the MSO (irrespective of whether they would add revenue or profit for the MSO).

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A computerized method of providing targeted advertisements in a content distribution network, said computerized method comprising:

obtaining, at a computerized advertising management apparatus, a plurality of advertisement segments within said content distribution network, each one of said plurality of advertisement segments further comprising information descriptive of a target audience thereof;

identifying at least one opportunity for inserting at least one of said plurality of advertisement segments into a digital content stream at said computerized advertising management apparatus;

determining, at said computerized advertising management apparatus, characteristics of an audience associated with said at least one opportunity;

utilizing said computerized advertising management apparatus for determining a relationship between said at least one opportunity and said plurality of advertisement segments based at least in part on said information descriptive of said target audience and said characteristics said audience;

selecting for said at least one opportunity at least one of said plurality of advertisement segments, said selecting being based at least in part on a predetermined threshold number of characteristics which match between said information descriptive of said target audience of said at least one of said plurality of advertisement segments and said characteristics of said audience associated with said at least one opportunity, said characteristics of said audience associated with said at least one opportunity comprising a plurality of delivery platform types of said audience associated with said at least one opportunity, said predetermined threshold number being controlled by a network operator; and inserting said selected at least one of said plurality of advertisement segments at said at least one opportunity.

2. The method of claim 1, wherein said information comprises a plurality of aspects, each aspect having a weighted value and range of allowable variation associated therewith.

3. The method of claim 2, wherein said aspects comprise one or more of psychographic, demographic, and behavioral aspects.

4. The method of claim 1, wherein said characterizing said audience comprises characterizing according to one or more of psychographic, demographic, and behavioral attributes.

5. The method of claim 1, wherein said selecting is further based at least in part on one or more factors regarding revenue or profit associated with ones of said plurality of advertisement segments.

6. The method of claim 1, wherein said at least one opportunity comprises at least one insertion opportunity in a digital video recorder (DVR) or a network personal video recorder (nPVR) presentation of digitally rendered primary content.

7. The method of claim 1, wherein said at least one opportunity comprises at least one insertion opportunities in an electronic programming guide (EPG) or telephony user interface.

8. The method of claim 1, wherein said at least one opportunity comprises at least one insertion opportunity in a video on-demand (VoD) presentation of digitally rendered primary content.

9. The method of claim 1, wherein said selecting is further based at least in part on a predetermined threshold of a number of views of said at least one of said plurality of advertisement segments by target demographic viewers.

10. Computerized network apparatus for selection of one of a plurality of digitally rendered secondary content for targeted insertion thereof into digitally rendered primary content, said computerized network apparatus comprising:

a storage apparatus;

a first data interface for receipt of at least information regarding said plurality of digitally rendered secondary content, said information being stored at said storage apparatus;

a second data interface for receipt of data representative of a request for digitally rendered secondary content, said data representative of said request comprising at least information regarding an audience, said information regarding said audience comprising at least said information relating to certain ones of a plurality of delivery platform types of respective ones of said audience; and a processor apparatus, said processor apparatus in data communication with said first data interface and said second data interface and said storage device and having apparatus for execution of at least one computer program thereon, said at least one computer program stored on the storage device and comprising a plurality of instructions which when executed, cause said computerized network apparatus to:

determine a placement of an insertion opportunity based at least in part on information relating to said certain ones of said plurality of delivery platform types;

determine a level of similarity between individual ones of said plurality of digitally rendered secondary content and said information regarding said audience of said insertion opportunity; and select one of said plurality of digitally rendered secondary content based at least in part on said determination of said placement of said insertion opportunity and said determination of said level of similarity;

wherein said information regarding said plurality of digitally rendered secondary content further comprises information regarding one or more restrictions to said selection of said digitally rendered secondary content, said selection being subject to said one or more restrictions; and wherein at least one of said one or more restrictions comprises a restriction of delivery of said digitally rendered secondary content to only requests for digitally rendered secondary content that is to be displayed at said certain ones of said plurality of delivery platform types.

11. The computerized network apparatus of claim 10, wherein said computerized network apparatus further comprises a third interface for provision of information regarding said selected one of said plurality of digitally rendered secondary content to an entity for provision of said selected one of said plurality of digitally rendered secondary content to an initiator of said request.

12. The computerized network apparatus of claim 10, wherein said digitally rendered secondary content comprises advertising or promotional content.

13. The computerized network apparatus of claim 10, wherein said digitally rendered secondary content comprises an info-mercial that is contextually associated with said digitally rendered primary content.

14. The computerized network apparatus of claim 10, wherein at least one of said one or more restrictions comprises a restriction of said digitally rendered secondary content according to a billing scheme.

15. A computerized method for selecting at least one of a plurality of digitally rendered secondary content for targeted insertion thereof into digitally rendered primary content, said computerized method comprising:

receiving first data representative of a request for digitally rendered secondary content, said first data representative of said request comprising at least information regarding an audience, said information regarding said audience comprising at least information relating to certain ones of a plurality of delivery platform types of respective ones of said audience;

receiving second data relating to said plurality of digitally rendered secondary content, said second data comprising data indicative of one or more restrictions, at least one of the one or more restrictions comprising restricting delivery of individual ones of said plurality of digitally rendered secondary content to only requests for digitally rendered secondary content that is to be displayed according to said certain ones of said plurality of delivery platforms;

determining a placement of an insertion opportunity based at least in part on said information relating to said certain ones of a plurality of delivery platform types of respective ones of said audience;

generating data relating to a level of similarity between individual ones of said plurality of digitally rendered secondary content and said information regarding said audience of said insertion opportunity; and selecting one of said plurality of digitally rendered secondary content based at least in part on (i) said determining said placement of said insertion opportunity and (i) said data relating to said level of similarity, said selection being subject to said at least one of said one or more restrictions.

16. The computerized method of claim 15, further comprising:

determining one or more characteristics relating said placement of said insertion opportunity;

identifying certain ones of said plurality of digitally rendered secondary content which have at least a threshold level of similarity to said one or more characteristics of said placement of said insertion opportunity; and determining whether said identified certain ones of said plurality of digitally rendered secondary content have met or exceeded a threshold number of impressions;

wherein said one of said plurality of digitally rendered secondary content comprises one of said identified certain ones of said plurality of digitally rendered secondary content not meeting or exceeding said threshold number of impressions.

17. The computerized method of claim 16, wherein:

said receiving said second data comprises receiving data relating to one or more characteristics of said plurality of digitally rendered secondary content;

said identifying comprises comparing said one or more characteristics of said placement of said insertion opportunity with said one or more characteristics of said plurality of digitally rendered secondary content; and each one of said one or more characteristics of said plurality of digitally rendered secondary content is assigned a weighted value and an allowable variance value, said weighted value and said allowable variance value being utilized in said comparing.

18. The computerized method of claim 15, wherein said plurality of digitally rendered secondary content comprises available digitally rendered advertisement content.

19. The computerized method of claim 15, further comprising:

identifying a profile associated with said request as being one of: (i) a single-user profile or (ii) a multi-user profile;

wherein said selecting said one of said plurality of digitally rendered secondary content is further based on said identifying of said profile.

20. The computerized method of claim 15, wherein said plurality of digitally rendered secondary content each comprise digitally rendered programming from a plurality of different programming providers which have been pre-qualified by an operator of a content delivery network.

* * * * *

UNITED STATES PATENT AND TRADEMARK OFFICE
CERTIFICATE OF CORRECTION

PATENT NO. : 10,051,304 B2
APPLICATION NO. : 14/462300
DATED : August 14, 2018
INVENTOR(S) : Justin Tidwell et al.

It is certified that error appears in the above-identified patent and that said Letters Patent is hereby corrected as shown below:

In the Claims

Currently reads (Column 39, Line 34-Column 40, Line 10, (approx.) Claim 15):
"15. A computerized method for selecting at least one of a plurality of digitally rendered secondary content for targeted insertion thereof into digitally rendered primary content, said computerized method comprising:
    receiving first data representative of a request for digitally rendered secondary content, said first data representative of said request comprising at least information regarding an audience, said information regarding said audience comprising at least information relating to certain ones of a plurality of delivery platform types of respective ones of said audience;
    receiving second data relating to said plurality of digitally rendered secondary content, said second data comprising data indicative of one or more restrictions, at least one of the one or more restrictions comprising restricting delivery of individual ones of said plurality of digitally rendered secondary content to only requests for digitally rendered secondary content that is to be displayed according to said certain ones of said plurality of delivery platforms;
    determining a placement of an insertion opportunity based at least in part on said information relating to said certain ones of a plurality of delivery platform types of respective ones of said audience;
    generating data relating to a level of similarity between individual ones of said plurality of digitally rendered secondary content and said information regarding said Signed and Sealed this
Sixteenth Day of July, 2019

Andrei Iancu
*Director of the United States Patent and Trademark Office*

CERTIFICATE OF CORRECTION (continued)
U.S. Pat. No. 10,051,304 B2 audience of said insertion opportunity; and
selecting one of said plurality of digitally rendered secondary content based at least in part on (i) said determining said placement of said insertion opportunity and (i) said data relating to said level of similarity, said selection being subject to said at least one of said one or more restrictions."

Should read:
--15. A computerized method for selecting at least one of a plurality of digitally rendered secondary content for targeted insertion thereof into digitally rendered primary content, said computerized method comprising:
receiving first data representative of a request for digitally rendered secondary content, said first data representative of said request comprising at least information regarding an audience, said information regarding said audience comprising at least information relating to certain ones of a plurality of delivery platform types of respective ones of said audience;
receiving second data relating to said plurality of digitally rendered secondary content, said second data comprising data indicative of one or more restrictions, at least one of the one or more restrictions comprising restricting delivery of individual ones of said plurality of digitally rendered secondary content to only requests for digitally rendered secondary content that is to be displayed according to said certain ones of said plurality of delivery platforms;
determining a placement of an insertion opportunity based at least in part on said information relating to said certain ones of a plurality of delivery platform types of respective ones of said audience;
generating data relating to a level of similarity between individual ones of said plurality of digitally rendered secondary content and said information regarding said audience of said insertion opportunity; and
selecting one of said plurality of digitally rendered secondary content based at least in part on (i) said determining said placement of said insertion opportunity and (ii) said data relating to said level of similarity, said selection being subject to said at least one of said one or more restrictions.--